(12) United States Patent
Kuta et al.

(10) Patent No.: US 11,436,781 B2
(45) Date of Patent: Sep. 6, 2022

(54) SYSTEM AND METHOD FOR ARTIFICIAL NEURAL-NETWORK BASED ANIMATION WITH THREE-DIMENSIONAL RENDERING

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Amitay Nachmani, Tel Aviv (IL); Matan Ben-Yosef, Tel Aviv (IL); Or Gorodissky, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 0 days.

(21) Appl. No.: 17/376,825

(22) Filed: Jul. 15, 2021

(65) Prior Publication Data

US 2022/0020197 A1    Jan. 20, 2022

Related U.S. Application Data

(63) Continuation-in-part of application No. 17/223,561, filed on Apr. 6, 2021.
(Continued)

(51) Int. Cl.
*G06T 13/40* (2011.01)
*G06N 20/00* (2019.01)
*G06V 10/40* (2022.01)

(52) U.S. Cl.
CPC .............. *G06T 13/40* (2013.01); *G06N 20/00* (2019.01); *G06V 10/40* (2022.01)

(58) Field of Classification Search
CPC ......... G06T 13/00; G06T 13/40; G06T 13/80; G06N 20/00; G06K 9/00281;
(Continued)

(56) References Cited

U.S. PATENT DOCUMENTS 6,278,791 B1    8/2001  Honsinger et al.
8,270,718 B2    9/2012  Drory et al.
(Continued)

FOREIGN PATENT DOCUMENTS

EP          3451209       3/2019
KR        102123248       6/2020
(Continued)

OTHER PUBLICATIONS

Ha S, Kersner M, Kim B, Seo S, Kim D. MarioNETte: Few-shot Face Reenactment Preserving Identity of Unseen Targets. arXiv preprint arXiv: 1911.08139. Nov. 19, 2019. (Year: 2019).*
(Continued)

*Primary Examiner* — Vu Le
*Assistant Examiner* — Tracy Mangialaschi
(74) *Attorney, Agent, or Firm* — Pearl Cohen Zedek Latzer Baratz LLP

(57) ABSTRACT

A system and method of animating an image of an object by extracting a plurality of three dimensional (3D) features from a first image, depicting a puppet object, and from the second image of a driver object, obtaining, a value of a first 3D identity-invariant feature of the puppet object, and a value of a second 3D identity-invariant feature, from the second image, calculating and applying, a mixing function, on the plurality of 3D features, generating a rendered image, based on the plurality of 3D features, the first 3D identity-invariant feature and the second 3D identity-invariant feature, and generating an output image based on the rendered image, the plurality of 3D features, the first image and the second image, wherein the output image depicting a target object comprising at least one 3D identity-invariant feature of the driver object.

20 Claims, 13 Drawing Sheets

Related U.S. Application Data

(60) Provisional application No. 63/052,058, filed on Jul. 15, 2020, provisional application No. 63/052,059, filed on Jul. 15, 2020.

(58) Field of Classification Search
CPC .. G06K 9/00302; G06K 9/6256; G06K 9/726; G06V 10/40
See application file for complete search history.

(56) References Cited

U.S. PATENT DOCUMENTS

| | | | |
|---|---|---|---|
| 9,105,119 | B2 | 8/2015 | Whitehill et al. |
| 10,552,977 | B1* | 2/2020 | Theis ................ G06K 9/00228 |
| 2007/0236513 | A1 | 10/2007 | Hedenstroem et al. |
| 2010/0074525 | A1 | 3/2010 | Drory et al. |
| 2011/0123118 | A1 | 5/2011 | Nayar et al. |
| 2012/0177248 | A1 | 7/2012 | Shuster |
| 2012/0288166 | A1 | 11/2012 | Sun et al. |
| 2014/0328547 | A1 | 11/2014 | Whitehill et al. |
| 2014/0355668 | A1 | 12/2014 | Carmel et al. |
| 2015/0261995 | A1 | 9/2015 | Hudgins |
| 2015/0324633 | A1 | 11/2015 | Whitehill et al. |
| 2017/0301121 | A1 | 10/2017 | Whitehill et al. |
| 2017/0302661 | A1 | 10/2017 | Conell, II et al. |
| 2019/0122411 | A1* | 4/2019 | Sachs .................... G06T 7/248 |
| 2019/0147340 | A1 | 5/2019 | Zhang et al. |
| 2019/0188562 | A1 | 6/2019 | Edwards et al. |
| 2019/0238568 | A1 | 8/2019 | Goswami et al. |
| 2019/0332850 | A1 | 10/2019 | Sharma et al. |
| 2020/0097767 | A1 | 3/2020 | Perry et al. |
| 2020/0234480 | A1* | 7/2020 | Volkov ................... G06T 13/40 |
| 2020/0358983 | A1 | 11/2020 | Astarabadi et al. |
| 2020/0410739 | A1 | 12/2020 | Shin et al. |
| 2021/0224319 | A1 | 7/2021 | Ingel et al. |

FOREIGN PATENT DOCUMENTS

| | | |
|---|---|---|
| MX | 354612 | 3/2018 |
| MX | 2014015326 | 3/2018 |
| WO | WO 2015/039084 | 3/2015 |
| WO | WO 2015/039086 | 3/2015 |
| WO | WO 2016/107651 | 7/2016 |
| WO | WO 2018/225061 | 12/2018 |
| WO | WO 2019/014487 | 1/2019 |

OTHER PUBLICATIONS

Tran, Luan, and Xiaoming Liu. "On Learning 3D Face Morphable Model from In-the-wild Images." arXiv preprint arXiv: 1808.09560v2. Jul. 14, 2019. (Year: 2019).*
Liang Du et al. "GARP-Face: Balancing Privacy Protection and Utility Preservation in Face De-identification" IEEE International Joint Conference on Biometrics, Clearwater, FL, 2014, pp. 1-8.
Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.
Jourabloo et al. "Attribute Preserved Face De-identification" 2015 International Conference on Biometrics (ICB), Phuket, 2015, pp. 278-285.
Meng et al. "Face De-identification for Privacy Protection" 2014 37th International Convention on Information and Communication Technology, Electronics and Microelectronics (MIPRO), Opatija, 2014, pp. 1234-1239.
Gross et al. "Face De-Identification" In: Senior A. (eds) Protecting Privacy in Video Surveillance, pp. 129-146, Springer, London.
Bitouk et al. "Face Swapping: Automatically Replacing Faces in Photographs" ACM Trans. Graph. 27, Aug. 3, 2008, pp. 1-8.
Muraki et al. "Anonymizing Face Images by Using Similarity-Based Metric" 2013 International Conference on Availability, Reliability and Security, Regensburg, 2013, pp. 517-524.
Chi et al. "Facial Image De-ldentification using Identity Subspace Decomposition" 2014 IEEE International Conference on Acoustics, Speech and Signal Processing (ICASSP), Florence, 2014, pp. 524-528.
Gross, Ralph, et al. "Multi-pie." Image and Vision Computing 28.5 (2010): 807-813.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Ramanan, Deva, and Xiangxin Zhu. "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Perez et al. "Face recognition and De-Identification in the frequency domain", Dec. 31, 2016.
Sendik "What's in a face? Metric learning for face characterization" Computer Graphics Forum, 2019.
He et al. "AttGAN: Facial Attribute Editing by Only Changing What You Want" Jul. 25, 2018.
Chi Hehua et al. "Face de identification using facial identity preserving features" Dec. 14, 2015.
PCT Search Report for Application No. PCT/IL2020/051286, dated Mar. 18, 2021.
Justus Thies et al. "Face2Face: Real-time Face Capture and Reenactment of RGB Videos" CVPR2016, Jul. 29, 2020.
Naruniec et. al. "High-Resolution Neural Face Swapping for Visual Effects" vol. 39 No. 4 (2020).
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" *arXiv preprint arXiv: 1912.05566* Dec. 11, 2019.
Fried et al. "Text-based editing of talking-head video" ACM Transactions on Graphics vol. 38 Issue 4 Article No. 68, pp. 1-14, Jul. 4, 2019.
Office Action for U.S. Appl. No. 17/223,561, dated Jun. 22, 2021.
Ha et al. "MarioNETte: Few-shot Face Reenactment Preserving Identity of Unseen Targets" arXiv:1911.08139, Nov. 19, 2019.
Garrido et al. "Automatic Face Reenactment" 10.1109/CVPR.2014.537, 2014.
Gross et al. "Face De-Identification" In: Senior A. (eds) Protecting Privacy in Video Surveillance, pp. 129-146, Springer, London. 2009.
Chi et al. "Facial Image De-Identification using Identity Subspace Decomposition" 2014 IEEE International Conference on Acoustics, Speech and Signal Processing (ICASSP), Florence, 2014, pp. 524-528.
Gross, Ralph, et al. "Multi-pie." NIH Public Access, National Institute of Health. Proc Int Conf Autom Face Gesture Recongnit, May 1, 2010; vol. 28(5): pp. 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.

(56) References Cited

OTHER PUBLICATIONS

Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." Association for the Advancement of Artificial Intelligence (www.aaai.org). Google Research Google, Inc., 2017.
Das, Nilaksh et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012. pp 679-692.
Messer, Kieron, et al. "XM2VTSDB: The extended M2VTS database." Second international conference on audio and video-based biometric person authentication. vol. 964.1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Schmidhuber, Jurgen. "Deep Learning in Neural Networks: An Overview." Neural Networks, vol. 61, Jan. 2015, pp. 85-117 (available online Oct. 2014).
Girshick, Ross. "Fast r-cnn." Proceedings of the IEEE international conference on computer vision. 2015. pp. 1440-1448.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016. pp 2574-2482.
Xie, Cihang, et al. "Adversarial examples for semantic segmentation and object detection." Proceedings of the IEEE International Conference on Computer Vision. 2017. pp 1369-1378.
Olah, Chris, et al. "The building blocks of interpretability." Distill 3.3 (2018): e10.
Szegedy, Christian, et al. "Intriguing properties of neural networks." ICLR 2014 conference submission (Dec. 24, 2013).
Papernot, Nicolas, et al. "Practical black-box attacks against machine learning." Proceedings of the 2017 ACM on Asia Conference on Computer and Communications Security. ACM, 2017.
Csaji, Balazs Csanad. "Approximation with artificial neural networks." Faculty of Sciences, Etvs Lornd University, Hungary 24 (2001): p. 48.
Belhumeur, Peter N., et al. "Localizing parts of faces using a consensus of exemplars." IEEE transactions on pattern analysis and machine intelligence, vol. 35.12 (2013): pp. 545-552.
Xiangxin Zhu and Ramanan, Deva "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." ICLR 2015 (Apr. 10, 2014).
Goodfellow, Ian J., Jonathon Shlens, and Christian Szegedy. "Explaining and harnessing adversarial examples." ICLR 2015 (Mar. 20, 2015).

Perez et al. "Face recognition and De-Identification in the frequency domain", National Institute of Astrophysics, Optics and Electronics, Dec. 31, 2016.
Sendik "What's in a face? Metric learning for face characterization" EUROGRAPHICS, Computer Graphics Forum, 2019, vol. 38 (2019), No. 2 / P. Alliez and F. Pellacini, Eds.
He et al. "AttGAN: Facial Attribute Editing by Only Changing What You Want", Submitted Manuscript To IEEE Transactions on Image Processing, Jul. 25, 2018.
Chi Hehua et al. "Face de identification using facial identity preserving features", 2015 IEEE Global Conference on Signal and Information Processing (Global SIP), Dec. 14, 2015. pp. 586-590.
International Search Report for PCT App. No. PCT/IL2020/050907 dated Nov. 30, 2020.
International Search Report for PCT App. No. PCT/IL2019/050993 dated Dec. 31, 2019.
European Search Report for European App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005; vol. 17(2): pp. 232-243.
European Search Report for European Application No. EP20202094.7 dated Mar. 22, 2021.
International Search Report for PCT Application No. PCT/IL2020/051287 dated Mar. 25, 2021.
International Search Report for PCT Application No. PCT/IL2020/051291 dated Jan. 25, 2021.
Ren, Zhongzheng; Lee, Yong Jae; Ryoo. Learning to Anonymize Faces for Privacy Preserving Action Detection. European Conference on Computer Vision (ECCV), Jul. 26, 2018.
Letournel, Geoffrey; Bugeau, Aur?Lie; Ta, Vinh-Thong; Domenger, Jean-Philippe. Face De-identification with Expressions Preservations. International Conference on Image Processing (ICIP) 2015, Sep. 2015.
International Search Report for PCT Application No. PCT/IL2020/051286, dated Mar. 18, 2021.
Naruniec et. al. "High-Resolution Neural Face Swapping for Visual Effects", Eurographics Symposium on Rendering 2020, vol. 39, No. 4 (2020).
Thies et al. "Deferred Neural Rendering: Image Synthesis using Neural Textur", ACM Transactions on Graphics, vol. 38, Issue 4, Jul. 2019.
Thies et al. "Neural Voice Puppetry: Audio-driven Facial Reenactment", ECCV 2020 (available online Dec. 11, 2019).
Ha et al. "MarioNETte: Few-shot Face Reenactment Preserving Identity of Unseen Targets", The Thirty-Fourth AAAI Conference on Artificial Intelligence (AAAI 2020), pp. 10893-10900 (available online Nov. 19, 2019).
Garrido et al. "Automatic Face Reenactment", 2014 ECC papers European Conference on Computer Vision.
European Search Report for Application No. EP21182966, dated Dec. 16, 2022.
Blaž Meden, Refik Can Malli, Sebastjan Fabijan, Hazim Kemal Ekenel, Vitomir Štruc, Peter Peer "Face Deidentification with Generative Deep Neural Networks" IET Signal Processing Special Issue on Deidentification 2017.
Saheb Chhabra, Richa Singh, Mayank Vatsa, Gaurav Gupta "Anonymizing k-Facial Attributes via Adversarial Perturbations"1 IIIT Delhi, New Delhi, India 2 Ministry of Electronics and Information Technology, New Delhi, India, Sep. 28, 2018.
U.S. Office Action for U.S. Appl. No. 17/376,825, dated Dec. 3, 2021.
Luan Tran, Xiaoming Liu "On Learning 3D Face Morphable Model from In-the-wild Images" EE Transactions on Pattern Analysis and Machine Intelligence (TPAMI) Aug. 28, 2018.
U.S. Office Action for U.S. Appl. No. 16/619,106 dated Oct. 22, 2021.
Karla Brkic; Ivan Sikiric; Tomislav Hrkac; Zoran Kalafatic "I Know That Person: Generative Full Body and Face De-identification of People in Images" 2017 IEEE Conference on Computer Vision and Pattern Recognition Workshops (CVPRW).
U.S. Office Action for U.S. Appl. No. 17/377,109 dated Nov. 2, 2021.

(56) References Cited

OTHER PUBLICATIONS

Shruti Palaskar, Vikas Raunak, Florian Metze "Learned In Speech Recognition: Contextual Acoustic Word Embeddings" Accepted at ICASSP 2019.

* cited by examiner

SYSTEM AND METHOD FOR ARTIFICIAL NEURAL-NETWORK BASED ANIMATION WITH THREE-DIMENSIONAL RENDERING

CROSS-REFERENCE TO RELATED APPLICATIONS

This application is a continuation in part of U.S. patent application Ser. No. 17/223,561 filed Apr. 6, 2021, which claims the benefit of Provisional U.S. Patent Application No. 63/052,058, filed Jul. 15, 2020 each of which is hereby incorporated by reference in its entirety. Additionally, this application claims the benefit of Provisional U.S. Patent Application No. 63/052,059, filed Jul. 15, 2020 which is hereby incorporated by reference in its entirety.

FIELD OF THE INVENTION

The present invention relates generally to Neural Networks (NNs). More specifically, the present invention relates to artificial NN (ANN)-based animation using three dimensional (3D) rendering methods.

BACKGROUND OF THE INVENTION

Currently available systems and methods may implement animation of a first object, according to information relating to movement of a second object. For example, a still image depicting a first face may be animated according to a video depicting movement of a second face: a video of the first face may be produced, depicting movement of the first face in a manner that is similar to the movement of the second face.

Such systems may, for example, apply graphical techniques such as object swapping, or face swapping, as known in the art. Such techniques may result in an output animation that may include poor timewise consistency, and/or poor effective resolution, and may require additional rendering computations to achieve a desired quality of animation video.

SUMMARY OF THE INVENTION

A system and a method for animating an image of an object, the method includes receiving a first image, depicting a puppet object, sampling an input video, depicting a driver object, to obtain a second image, extracting a plurality of three dimensional (3D) features from the first image and from the second image, obtaining, by a first machine-learning (ML) model, a value of a first 3D identity-invariant feature of the puppet object, and a value of a second 3D identity-invariant feature, from the second image, calculating, by a second ML model, a mixing function, based on the first 3D identity-invariant feature and the second 3D identity-invariant feature, applying the mixing function on the plurality of 3D features, generating by a third ML model, a rendered image, based on the plurality of 3D features, the first 3D identity-invariant feature and the second 3D identity-invariant feature and generating by a fourth ML model an output image based on the rendered image, the plurality of 3D features, the first image and the second image. The output image depicts a target object which may include at least one 3D identity-invariant feature of the driver object.

Some embodiments of the invention may include repeating the steps of obtaining, calculating, applying, generating the rendered image and generating the output image to obtain a next output image.

Some embodiments of the invention may include appending the next output images to the output image to produce an output video depicting animation of the puppet object.

According to some embodiments of the invention, calculating the mixing function may include assigning a first weight value to the first 3D identity-invariant feature and assigning a second weight value to the second 3D identity-invariant feature.

According to some embodiments of the invention, the mixing function may include a combination between first 3D identity-invariant feature and the second 3D identity-invariant feature.

According to some embodiments of the invention, the second 3D identity-invariant feature is related to a scene depicted in the second image.

According to some embodiments of the invention, the output image has higher quality than the quality of the rendered image.

Some embodiments of the invention may further include comparing one or more 3D features from the plurality of 3D features to a related 3D feature from 3D ground truth data and updating the output image based on a calculated gradient.

Some embodiments of the invention may further include applying the mixing function on the plurality of 3D features by applying the mixing function on a first set of 3D features from the first image and on a second set of 3D features from the second image.

Some embodiments of the invention may include a system for animating an image of an object, the system may include a memory and a processor configured to receive a first image, depicting a puppet object, sample an input video, depicting a driver object, to obtain a second image, extract a plurality of three dimensional (3D) features from the first image and from the second image, obtain, by a first machine-learning (ML) model, a value of a first 3D identity-invariant feature of the puppet object, and a value of a second 3D identity-invariant feature, from the second image, calculate, by a second ML model, a mixing function, based on the first 3D identity-invariant feature and the second 3D identity-invariant feature, apply the mixing function on the plurality of 3D features, generate by a third ML model, a rendered image, based on the plurality of 3D features, the first 3D identity-invariant feature and the second 3D identity-invariant feature and generate by a fourth ML model an output image based on the rendered image, the plurality of 3D features, the first image and the second image, wherein the output image depicts a target object comprising at least one 3D identity-invariant feature of the driver object.

In some embodiments of the invention, the processor is further configured to repeat the steps of obtain, calculate, apply, generate the rendered image and generate the output image to obtain a next output image.

In some embodiments of the invention, the processor is further configured to append the next output image to the output image to produce an output video depicting animation of the puppet object.

In some embodiments of the invention, the processor is further configured to calculate the mixing function by assigning a first weight value to the first 3D identity-invariant feature and assigning a second weight value to the second 3D identity-invariant feature.

In some embodiments of the invention, the processor is further configured to compare one or more 3D features from the plurality of 3D features to a related 3D feature from 3D ground truth data and updating the output image based on a calculated gradient.

In some embodiments of the invention, the processor is further configured to apply the mixing function on the plurality of 3D features comprises applying the mixing function on a first set of 3D features from the first image and on a second set of 3D features from the second image.

Some embodiments of the invention may include a method of animating an image of an object, the method may include: determining a plurality of three dimensional (3D) features from a first image, depicting a first object and from a second image, wherein the second image is sampled from an input video depicting a second object, applying a mixing function on the plurality of 3D features, wherein the mixing function is calculated, based on a first 3D identity-invariant feature of the first object and a second 3D identity-invariant feature from the second image, generating a created image, based on the plurality of 3D features, the first 3D identity-invariant feature and the second 3D identity-invariant feature, and generating an output image depicting a target object comprising at least one 3D identity-invariant feature of the second object, wherein the output image is generated based on the plurality of 3D features, the created image, the first image and the second image.

Some embodiments of the invention may include repeating the steps of determining, applying, and generating the created image and generating the output image to obtain a plurality of output images and generating a video depicting animation of the first object from the plurality of output images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
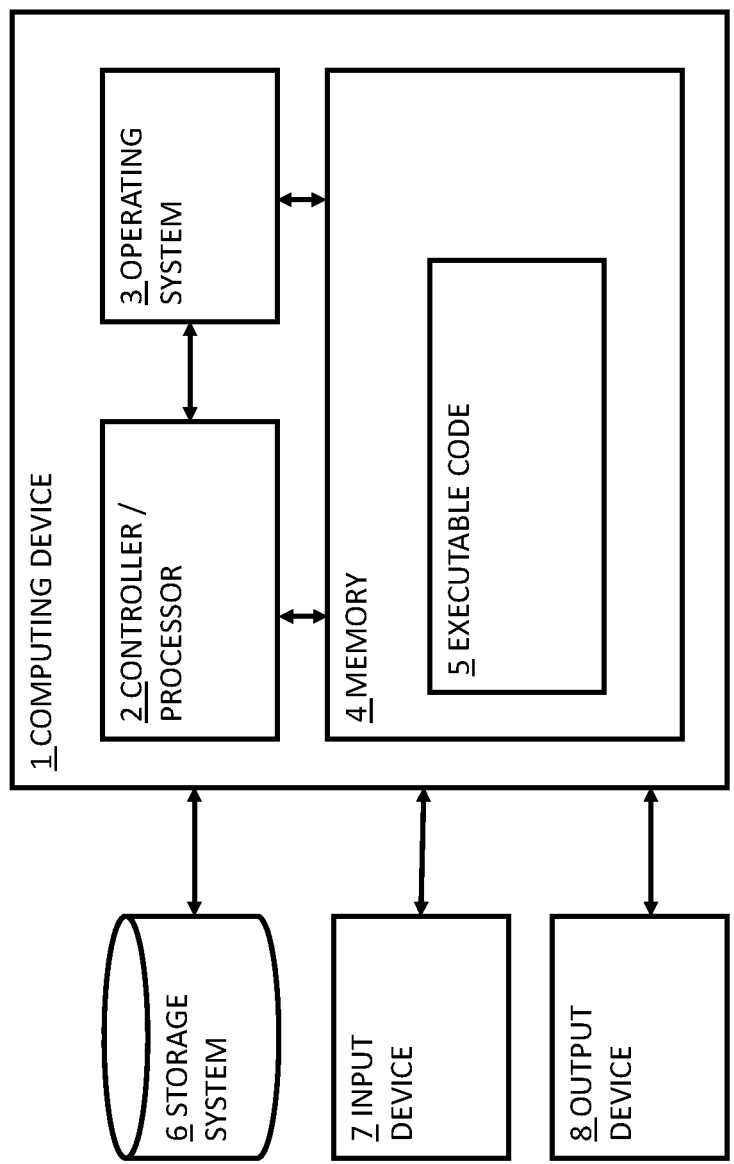
FIG. 1 is a block diagram, depicting a computing device which may be included in a system for artificial neural-network based animation, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions which when executed by a processor cause the processor to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for artificial neural-network based animation, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tF5025 asks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may execute (e.g., train and/or infer) an artificial neural-network to animate (e.g. convert from a still image to a moving image typically including a series of still images played as a video, movie or moving image) at least one image, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more machine learning (ML) modules may be stored in storage system 6 and may be loaded from storage system 6 into memory 4 where it may be processed by processor or controller 2, to perform animation of at least one image, for example by executing or simulating a NN. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A NN or ANN, e.g. a NN implementing machine learning, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations: for example a processing system as in FIG. 1 may execute a NN by performing operations on the mathematical representation of the NN.

Figure 2:
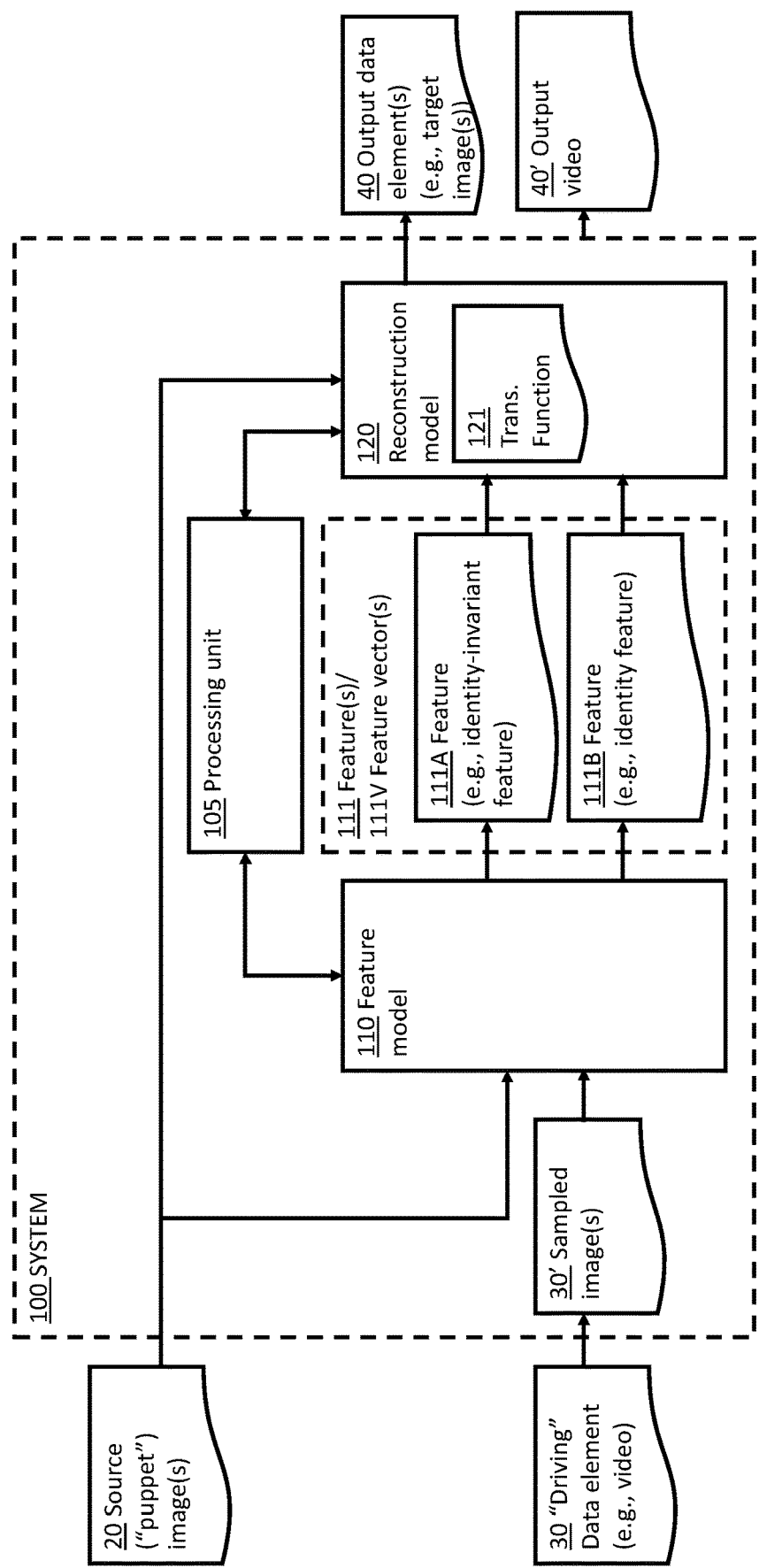
FIG. 2 is a block diagram, depicting an example of a system for ANN based animation, according to some embodiments of the invention.

Reference is now made to FIG. 2, which is a block diagram, depicting a system 100 for ANN based animation, according to some embodiments of the invention. According to some embodiments of the invention, system 100 may be implemented as a software module, a hardware module or any combination thereof. For example, system may be or may include a computing device such as element 1 of FIG. 1, and may be adapted to execute one or more modules of executable code (e.g., element 5 of FIG. 1) to perform animation of at least one image, as further described herein.

Much of the examples brought herein relate to embodiments in which the animated object is that of a face. However, it may be appreciated by a person skilled in the art that similar implementations may be utilized to animate other types of objects (e.g., body parts, cars, plants, animals, etc.), with the required modifications.

According to some embodiments of the invention, system 100 may include an ANN-based feature model 110. Feature model 110 may be adapted to receive at least one data element such as a source image 20 depicting a puppet object and/or one or more driving images 30 depicting a driver object. Feature model 110 may extract from the at least one data element 20 and/or 30 at least one feature vector 111V. Feature vector 111V may be a set or group of one or more features 111 included in the at least one image data element 20 and/or data element 30. For example, at least one data element 20 and/or data element 30 may be an image of an object, and the one or more features 111 may represent characteristics or features of the depicted object. Feature vector 111V may be an ordered series of numbers, each representing a feature.

For example, data elements 20 and/or 30 may include depiction of a face, and ML-based feature extraction model 110 may be trained to extract at least one feature pertaining to the face, such as a pose feature, an expression feature, a lighting feature and/or a point of view feature.

The terms "data element", "image" and "video" may be used interchangeably in the context of elements 20, 30, 30' 40 and 40' to indicate static or moving that may be presented e.g., on a screen such as output device 8 of FIG. 1. The term puppet or "source" may be used interchangeably in relation to image 20, to indicate an object that is included or depicted in image 20, and that may be animated by embodiments of the invention, as elaborated herein. The term driver may be used herein, in relation to image or video 30, to indicate an object that is included or depicted in one or more images (e.g., a video) 30, by which embodiments of the invention may animate a puppet object depicted in image 20, as elaborated herein. The terms "output" and "target" may be used interchangeably in relation to elements 40 and 40', to indicate one or more output image or video elements that may be produced by embodiments of the invention, and may include an animated version of puppet object, as elaborated herein.

According to some embodiments, an object depicted in image 20 and/or data element 30 may be a human face or head, and the one or more features 111 may include identity-related features 111B, representing characteristics pertaining to identity (e.g., the identity of a person whose face is depicted). Additionally, or alternatively, the one or more features 111 may include identity-invariant features 111A, that may not represent characteristics pertaining to identity, as elaborated herein.

The term "feature" may be used herein to refer to a measurable property of an input data element. For example, in an embodiment where data element 20 is an image depicting an object, such as a face, a feature vector 111V of data element 20 may include, for example a data structure, such as a vector of features 111 represented as numerical elements. Features 111 may represent or describe specific properties of the depicted face. Features 111 may for example include identity-related features 111B, that may indicate aspects of a person's identity (e.g., age, gender, ethnicity, etc.). Alternatively, features 111 may include identity-invariant features 111A that do not indicate or represent aspects of a person's identity (e.g., clothing, position, pose, expression, lighting, point of view etc.). In some embodiments, feature vector 111V may be expressed by, or emitted as an output layer of neural nodes of feature model 110, however it may be clear to a person skilled in the art that other implementations for extracting feature vector 111V and/or features 111 may also be possible.

The term "identity feature" or "identity-related feature" may be used herein to refer to a data structure (e.g., a feature vector 111V) that may represent one or more features or characteristics of an object such as a face depicted in an image, and may be used (e.g., by a face recognition (FR) ML-based model, as known in the art) to identify the object. For example, an identity feature may include a representation of facial characteristics or properties such as age, gender, ethnicity, complexion, geometry of facial organs (e.g., length of nose, distance between the eyes, etc.) and the like, which may be used by a FR model to determine whether a depicted face pertains to a first person or to a second person.

The term "identity-invariant feature" vector may be used herein to refer to a data structure (e.g., a feature vector 111V) that may represent one or more features or characteristics of an object depicted in an image, but may nevertheless not facilitate identification of the object, or distinction of the object among other objects of the same type or category.

According to some embodiments, element 20 and/or element(s) 30 may be an image depicting an object, such as a car or a face. Feature model 110 may be adapted to extract a feature vector 111V that includes a value of at least one identity-invariant feature 111A. For example, the at least one identity-invariant feature 111A may be a pose feature 111A, representing a pose of the object (e.g., the car, the face) in the image. Additionally, or alternatively, feature model 110 may be adapted to extract an identity-invariant feature 111A such as a lighting feature, representing a lighting of the object (e.g., the car, the face) in the image. Additionally, or alternatively, feature model 110 may be adapted to extract an identity-invariant feature 111A such as an expression feature 111A, representing an expression of a face depicted in the image. It may be appreciated that identity-invariant feature 111A such as the aforementioned pose feature, expression feature and lighting feature may describe or represent a characteristic of a depicted object such as face in an image but may nevertheless not facilitate identification of the object (e.g., the face). For example, knowledge of one or more identity-invariant features 111A may not suffice to enable identification of a depicted person, or a depicted object from objects of the same type (e.g., faces of other people). According to some embodiments, feature model 110 may a value of a first identity-invariant feature 111A of a puppet object, from data element 20 (e.g., a first image) and a value of at least one second identity-invariant feature 111A of a driver object, from respective at least one second data elements 30 (e.g., images).

The term "pose", as in a pose of an object (e.g., a car, a face) in an image may be used herein to refer to one or more data elements indicating a location of the object in the image. For example, a pose of a face may include a position of the face in the image (e.g., a position of a center point of the face, a position of a circumference of the face, and the like), and an angle (e.g., a yaw, a pitch and/or a roll) of the face in the image.

The term "lightning" as in a lighting of an object (e.g., a car, a face) in an image may be used herein to refer to one or more data elements indicating characteristics of lighting, including for example: an intensity of light, a direction of light, a concentration of light, a color or "temperature" of light, and the like. Additionally, the term "lighting" may refer to properties of a lighting source, that may illuminate the object, including for example, a type (e.g., ambient light source, point light source, etc.) a shape of a lighting spot or beam, a location of the light source (e.g., in relation to the illuminated object), and an intensity of the light source. Additionally, the term "lighting" may refer to lighting properties of a surface (e.g., a surface of the illuminated object), including for example diffusivity of the surface (e.g., a Lambertian quality of the surface), specularity (e.g., having the qualities of a mirror) of the surface and reflectiveness of the surface.

The term "expression", as in an expression of an object such as a face in an image, may be used herein to refer to a sentiment of the depicted face, e.g., whether the image depicts a face that is happy, sad, angry, and the like. Additionally, the term "expression" may also refer to existence of facial features in an image and/or to relative positioning of facial features in an image. For example, an expression may include appearance of teeth in an image, a location of pupils in an image (e.g., indicating a direction of observation), a position of key points of a depicted face, such as mouth edges (e.g., indicating a smile), and the like. Additionally, or alternatively the term "expression" may refer to one or more facial actions or conditions of a face, including for example raising of an eyebrow and/or opening of a mouth. It may be appreciated by a person skilled in the art that a weighted combination of such facial actions (e.g., by taking the intensity of specific facial actions into account) may be analyzed (e.g., by a Facial Action Coding System (FACS)) so as to obtain a perceived expression or sentiment of a face in an image.

According to some embodiments, system 100 may receive a first image 20 depicting a face, and a video data element 30 depicting movement of a second face. System 100 may sample video data element 30 to obtain at least one sampled image of the second face and analyze the first image and the at least one sampled image to obtain, for each image, at least one feature 111, such as a pose feature, an expression feature, a point of view feature and a lighting feature, as elaborated herein. System 100 may subsequently generate, based on the obtained features, an output video 40, depicting movement of the first face, that is substantially identical to movement of the second face and having the same expression and/or lighting as the second face, as elaborated herein.

According to some embodiments of the invention, system 100 may include an ANN-based reconstruction model 120. As elaborated herein, reconstruction model 120 may be adapted to generate an output data element 40 such as an image of an object (e.g., a face), given a source data element 20 (e.g., an image of a puppet face) and a feature vector that includes at least one feature 111 (e.g., an identity-invariant feature 111A) of a driving data element 30 (e.g., an image of a driver face).

For example, given a source data element 20 that is an image of a source face to animate, and one or more driver data elements 30 such as images of a driver face 30, feature model 110 may extract at least one identity-invariant feature 111A such as a pose feature, for one or more (e.g., each) of source image 20 and driver image(s) 30. Reconstruction model 120 may receive as inputs: (a) a feature vector 111V that includes at least one identity-invariant feature 111A (e.g., a pose feature), corresponding to source image 20 and driver image(s) 30, and (b) the static source image 20 depicting the source or puppet face 20. Reconstruction model 120 may be adapted to generate a new image, depicting the puppet face of source image 20, but having an identity-invariant feature 111A (e.g., a pose) of the driver face, depicted in driver image(s) 30.

According to some embodiments, both feature model 110 and reconstruction model 120 may be trained jointly in a self-supervised manner as elaborated herein, for the task of image (e.g., image of a human head) reconstruction. Once fully trained, both feature model 110 and reconstruction model 120 may be used for the task of animation (e.g., human head animation), as elaborated herein.

According to some embodiments, feature model 110 and reconstruction model 120 may jointly be or include a U-Net neural network configuration. A U-net NN may be a convolutional NN where multi scale skip connections are used to concatenate features at different scales, e.g., one or more bottleneck connections may be replaced with one or more multi scale skip connections. For example, a U-net NN may include down sampling blocks and/or up sampling blocks that may be connected with residual connections. The residual connections may pass information "as is" and therefore when a puppet and a driver are not aligned, the motion information may be collaborated in the residual connections, e.g., a motion formulation may be used to transform the information in each of the residual connections.

Figure 3:
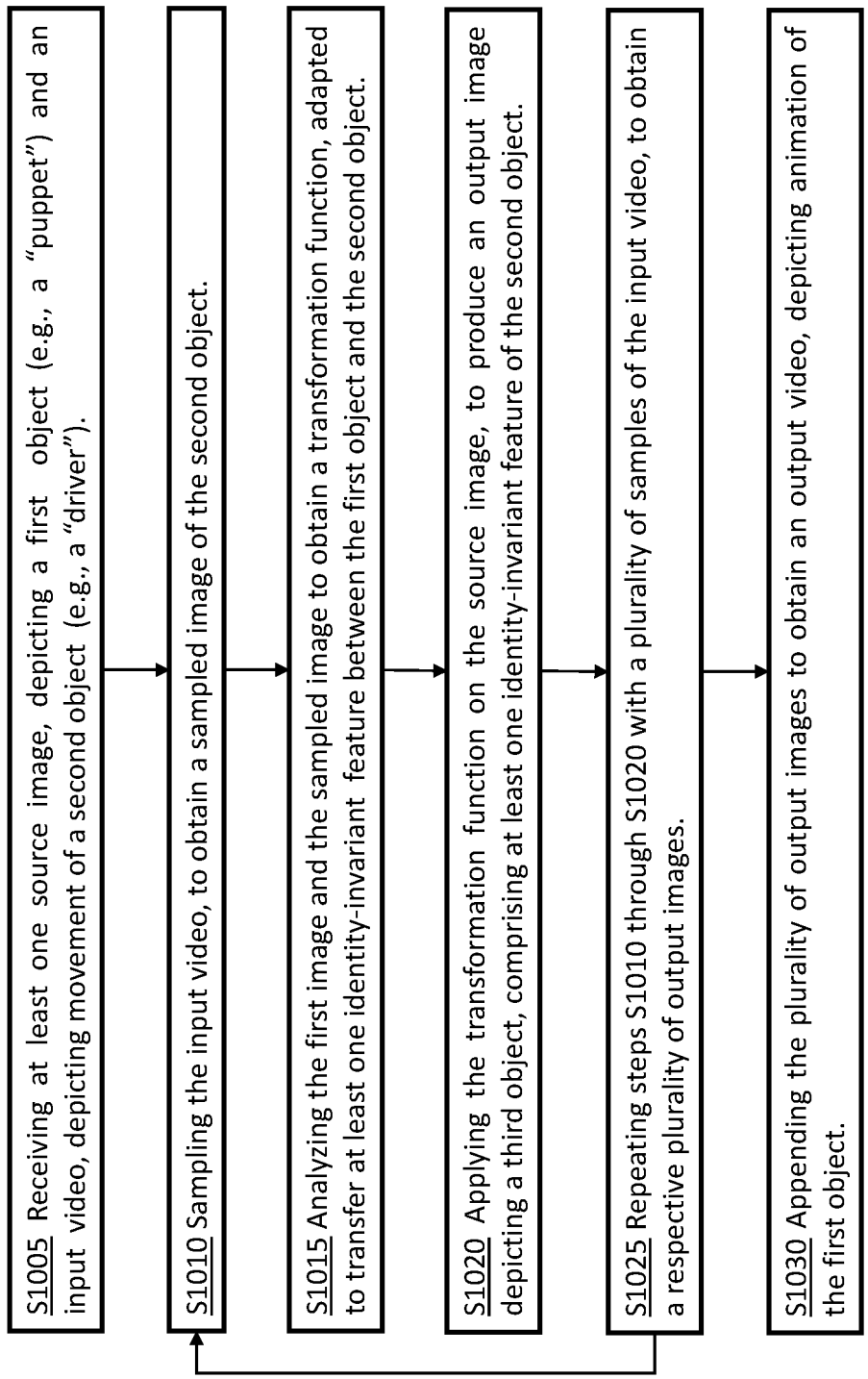
FIG. 3 is a flow diagram, depicting a method of ANN based animation, according to some embodiments of the invention.

Reference is now made to FIG. 3, which is a flow diagram, depicting a method of ANN based animation by a processing unit (e.g., element 105 of FIG. 2) comprising at least one processor (e.g., element 2 of FIG. 1), according to some embodiments of the invention.

As shown in step S1005, the at least one processor may receive at least one source image (e.g., source data element 20 of FIG. 2), depicting a first object such as a source or puppet face, and an input video, (e.g., driver data element 30 of FIG. 2), depicting movement of a second object such as a driver face. The input video may be a movie including a series of still images played at a speed such that a viewer perceives a moving image.

As shown in step S1010, processing unit 105 may sample the input video data element 30, to obtain a sampled image 30' of the second object, the image being part of the video. For example, the sampled image may be an image taken from the video which depicts the driver face, in a specific pose, presenting a specific expression, and shown at specific lighting conditions, as shown in the video data element at a specific point in time.

As known in the art, ML based models, such as models implemented by artificial NNs may be regarded as implementing a function, associating between input data (e.g., including at least one input image) and output data (e.g., including an output image). As shown in step S1015, the at least one processor may analyze the first image and the sampled image to obtain a transformation function 121, adapted to receive a first data element such as an image depicting a first object, and produce a second data element such as a second image depicting a second object, while transferring at least one identity-invariant feature between the first object and the second object.

According to some embodiments of the invention, ML-based feature model 110 of FIG. 2, may be adapted to receive an image depicting an object, and may be trained to extract a feature vector 111V that includes at least one identity-invariant feature 111A of the object depicted in the image. The at least one identity-invariant feature 111A may include for example, an as a pose feature, representing a pose of an object (e.g., a face, a car) in an image, and/or a lighting feature, representing a lighting of the object (e.g., the face, the car) in the image. Additionally, or alternatively, in embodiments where the depicted object is a face, feature model 110 may be adapted to extract a feature vector 111V that includes at least one identity-invariant feature 111A that is an expression feature 111A, representing an expression of the face depicted in the image.

According to some embodiments of the invention, feature model 110 may receive, as a first input, image 20, and may extract an identity-invariant feature 111A of an object (e.g., a face) depicted in image 20. Additionally, feature model 110 may receive, as a second input (e.g., after the first input), one or more sampled images 30', and may extract one or more respective, identity-invariant feature values 111A of an object (e.g., a face) depicted in sampled images 30'.

It may be appreciated by a person skilled in the art, that ML-based reconstruction model 120 of FIG. 2 may be regarded as implementing a transformation function 121, that associates or transforms between input data and output data. In this context, reconstruction model 120 of FIG. 2 may be regarded as implementing a transformation function 121 that associates between: (a) a source image 20, one or more feature data elements 111 pertaining to source image 20, and one or more feature data elements 111 pertaining to sampled data elements 30' on one side, and (b) an output image 40 on the other side.

According to some embodiments, during a training stage, ML-based reconstruction model 120 of FIG. 2 may be trained so as to produce, calculate or implement a transformation function 121, based on a first identity-invariant feature of a first (e.g., puppet) object depicted in image data object 20 and at least one second identity-invariant feature of a second (e.g., driver) object depicted in sampled image data objects 30'.

During an inference stage, ML-based reconstruction model 120 may implement transformation function 121 on at least one input image 20, to obtain one or more output or target images 40, depicting a target object. The target object may include at least one identity-invariant feature of a driver object, depicted in the one or more driving images 30.

For example, given an image 20 of a first object (e.g., a first face), associated with, or having a first feature vector 111V, and an image (e.g., sampled image 30') of a second object (e.g., a second face), associated with a second feature vector 111V, reconstruction model 120 may be adapted to produce a third, output image 40, depicting a third object (e.g., a third face), that may include a mixture of features 111 included in the feature vectors 111V of the first object and second object.

According to some embodiments of the invention, reconstruction model 120 may apply transformation function 121 on a source image 20, depicting a first object, to produce an output image 40, depicting another object. In such embodiments, reconstruction model 120 may receive input data that includes: (a) source image 20 depicting an object, (b) at least one identity-invariant feature 111A of the object (from feature model 110), and (c) at least one identity-invariant feature 111A of an object depicted in sampled image 30'. ML-based reconstruction model 120 may be applied on the input data, to produce an output image 40.

For example, the depicted object may be that of a face. Reconstruction model 120 may be adapted to receive, from feature model 110, at least one identity-invariant feature 111A of a first face depicted in image 20 and at least one identity-invariant feature 111A of a second face depicted in image 30 (e.g., of sampled image 30'). As elaborated herein, reconstruction model 120 may be trained to implement a transformation function 121 that may transfer at least one identity-invariant feature 111A from the face of image 30' to the face of image 20.

For example, reconstruction model 120 may produce an output image 40, which may depict a third face. The third face may have at least one identity feature 111B of the first face of image 20. For example, the third face may be recognizable (e.g., by a human observer, by a face-recognition module, and the like) as pertaining to or belong to the same person as the first face. Nevertheless, the third face of output image 40 may have at least one identity-invariant feature 111A (e.g., pose, expression, feature, lighting, point of view and the like) as that of sampled image 30'. For example, the third face depicted in output image 40 may have an expression feature value that is substantially equal to (e.g., according to some predefined metric) the expression feature value of the face depicted in sampled image 30'. In other words, the face depicted in output image 40 may be recognizable (e.g., by an FR algorithm) as the same face depicted in image 20, but may portray the same expression, lighting and/or pose as the face depicted in sampled image 30'. In other words, output image 40 may include a pose feature equivalent or equal to the pose feature of sampled image 30', an expression feature equivalent or equal to the expression feature of sampled image 30', and/or a lighting feature equivalent or equal to the lighting feature of the sampled image 30'.

As shown in step S1020, processing unit 105 may utilize reconstruction model 120 to apply transformation function 121 on the source image 20, to produce an output image 40 depicting a third object. The third object may include at least one identity-invariant feature 111A of the object of the sampled image 30', as explained herein.

As shown in step S1025, processing unit 105 may repeat steps S1010 through S1020 with a plurality of samples 30' of the input video, to obtain a respective plurality of output data elements 40, such as a plurality of target images 40.

As shown in step S1030, processing unit 105 may append or assemble the plurality of output data elements 40 (e.g., output images), e.g. append a new image to a video being assembled, to produce or obtain an output video 40' (e.g. including a series of images), depicting animation of the first object (e.g., the first face). For example, output video 40' may depict a first face (e.g., the puppet face of image 20), that is (a) moving according to the poses of a second face (e.g., sampled driver face of image 30'), (b) presenting similar expressions to those of sampled face 30', and/or (c) lighted by the same lighting features as sampled face 30'.

According to some embodiments of the invention, processing unit 105 may be adapted to train at least one of feature model 110 and reconstruction ML model 120. For example, processing unit 105 may be adapted to train reconstruction ML model 120 so as to implement transformation function 121, based on a training dataset comprising a plurality of source images 20 depicting a first, puppet object, a corresponding plurality of identity-invariant feature data elements 111A of the first object, and at least one identity-invariant feature 111A of a second, driver object, depicted in one or more sampled images 30'.

According to some embodiments of the invention, the puppet object, depicted in the one or more source images, and the driver object depicted in the one or more sampled images 30' may be the same object, thus enabling processing unit 105 to perform self-supervisory training of at least one of feature model 110 and reconstruction model 120.

For example, the first, puppet object depicted in source image 20 may be a first face, the second, driver object depicted in sampled image 30' may be a second face, and the third, output object depicted in output image 40 may be a third face. The first face and the second face may pertain to the same person. Thus, processing unit 105 may train at least one of feature model 110 and reconstruction model 120 using the second face as self-supervisory data.

In other words, as the values of identity features 111B of the puppet face and driver face may be substantially equal (e.g., both faces pertaining to the same person), feature model 110 may be trained to extract a feature vector 111V, that includes features 111 that are oblivious to identity (and hence are identity-invariant 111A). Moreover, feature model 110 and/or reconstruction model 120 may be trained to produce output image 40 in a self-supervisory manner. The term "self-supervisory" may be used herein in a sense that output image 40 should be equal to the input of sampled image 30', and no additional information or label may be required for the training process.

Figure 4:
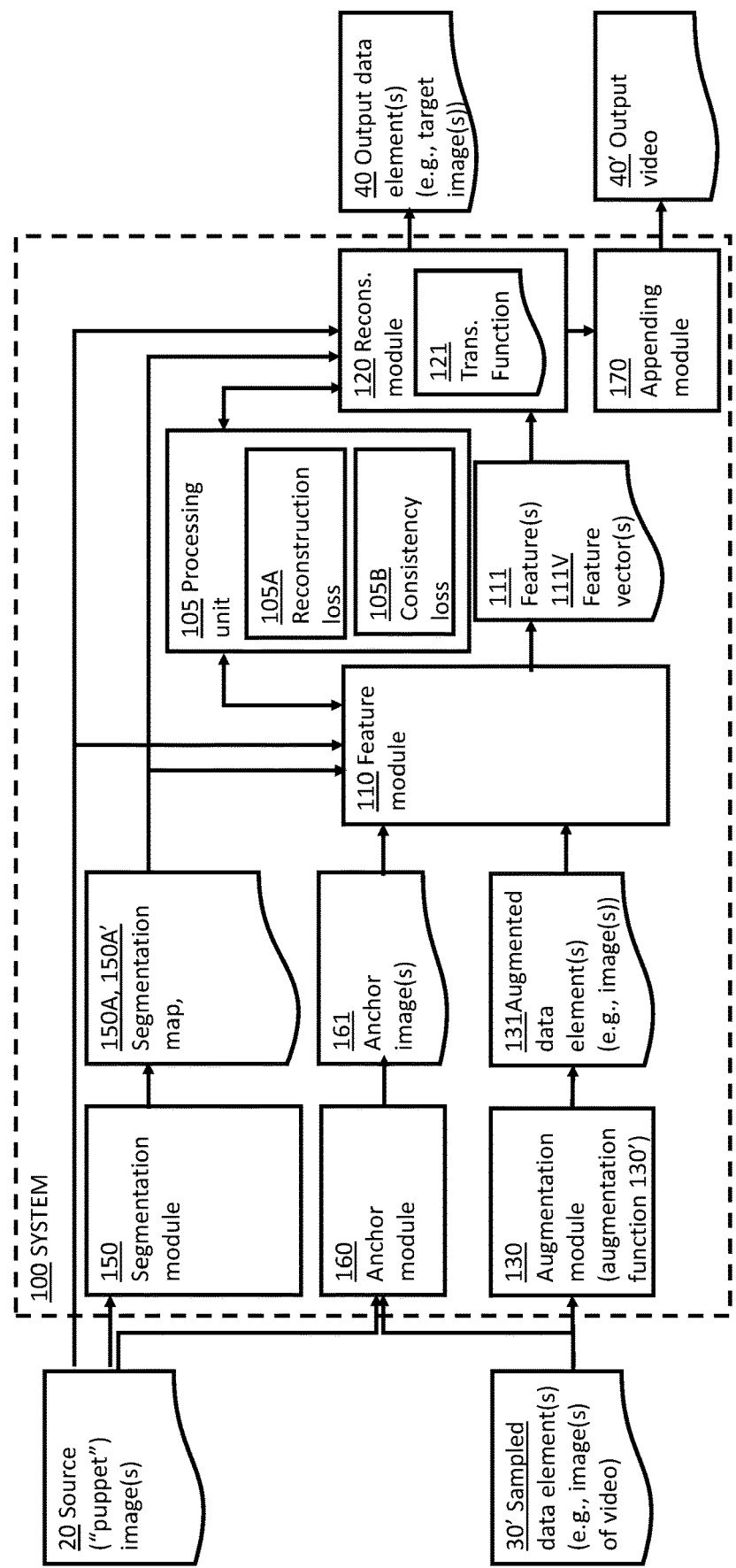
FIG. 4 is a block diagram, depicting another example of a system for ANN based animation, according to some embodiments of the invention.

Reference is now made to FIG. 4, which is a block diagram, depicting an example of a system 100 for ANN based animation, according to some embodiments of the invention. It may be appreciated that some of the elements included in FIG. 2 have been omitted from FIG. 4, for the purpose of clarity. Additionally, the arrows of FIG. 4 represent flow of data among the different modules included in system 100. It may be appreciated that some of the arrows have been omitted for the purpose of clarity.

According to some embodiments of the invention, system 100 may include an augmentation module 130, adapted to perform at least one augmentation function 130' on source image 20 or sampled image 30', to obtain at least one augmented image 131, comprising an augmented representation of a respective face.

For example, augmentation function 130' may include a change of a colorization aspect of an image, such as a change in the image's color, brightness, contrast, sharpness, etc. In another example, augmentation function 130' may include a change in a representation of an image, including for example a tilt, a change of an aspect ratio, a flip of an image, etc. Other augmentation function 130' may also be possible.

According to some embodiments of the invention, processing unit 105 may train the at least one of feature model 110 and/or reconstruction model 120, using augmented image 131 (e.g., the augmented representation of the face, depicted in augmented image 131) as self-supervisory data.

Pertaining to the above example, in which the face of image 20 and the face of sampled image 30' pertain to the same person, processing unit 105 may apply augmentation function 130' on sampled image 30' to produce an augmented image 131, comprising an augmented representation of a face depicted in sampled image 30', and may then use the augmented representation of the face, depicted in augmented image 131 as self-supervisory data, to train reconstruction model 120 so as to produce an output image 40 that is equal or equivalent (e.g., according to a predetermined metric) to augmented image 131.

In another example, processing unit 105 may apply augmentation function 130' on a source image 20, to produce an augmented image 131, comprising an augmented representation of a face depicted in source image 20, and may then use the augmented representation of the face, depicted in augmented image 131 as self-supervisory data, to train reconstruction model 120 so as to produce an output image 40 that is equal or equivalent to augmented image 131.

Figure 5A:
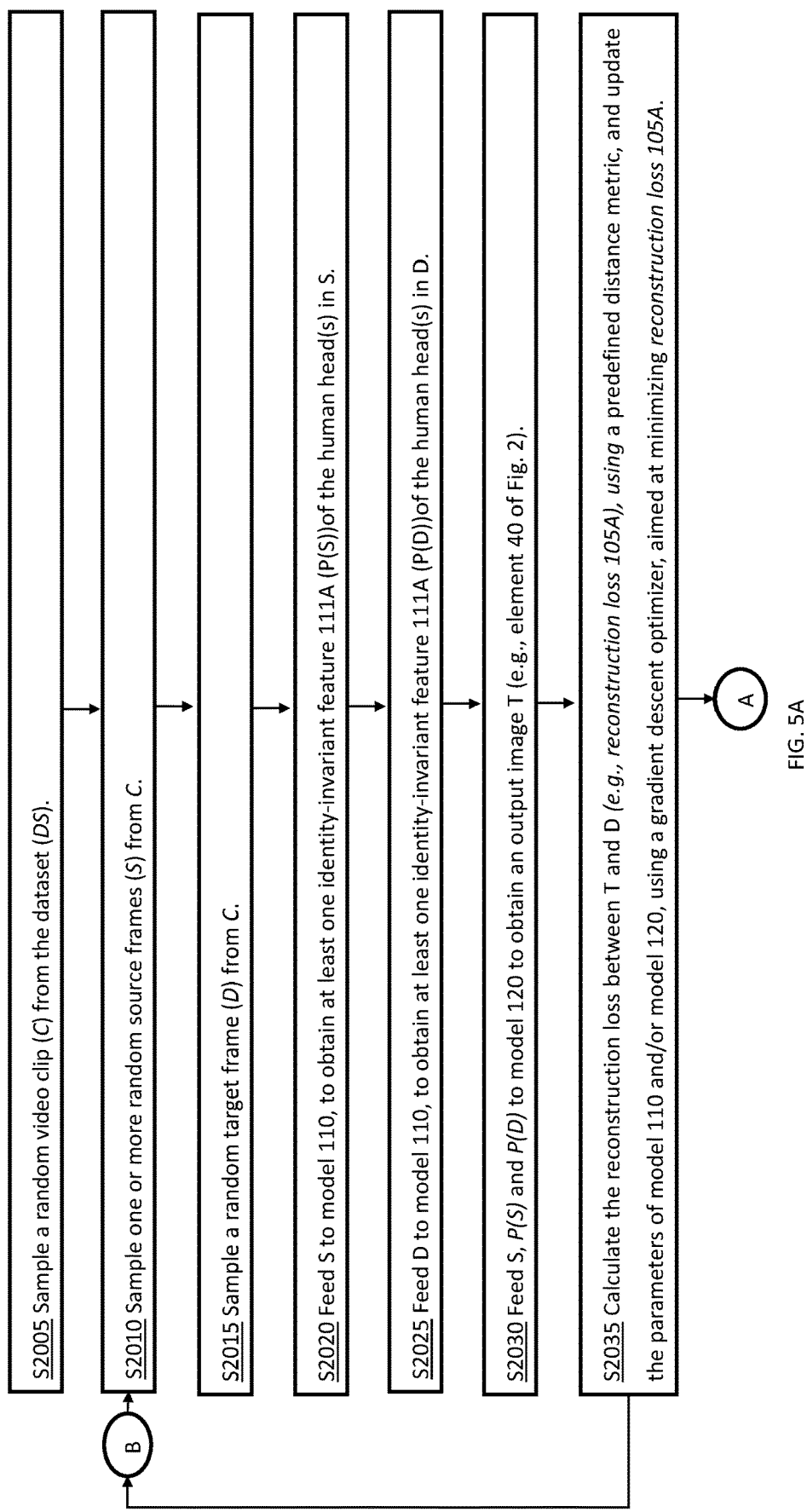
FIGS. 5A and 5B are flow diagrams, jointly depicting an example of a method of training modules of a system for ANN based animation, according to some embodiments of the invention.
Figure 5B:
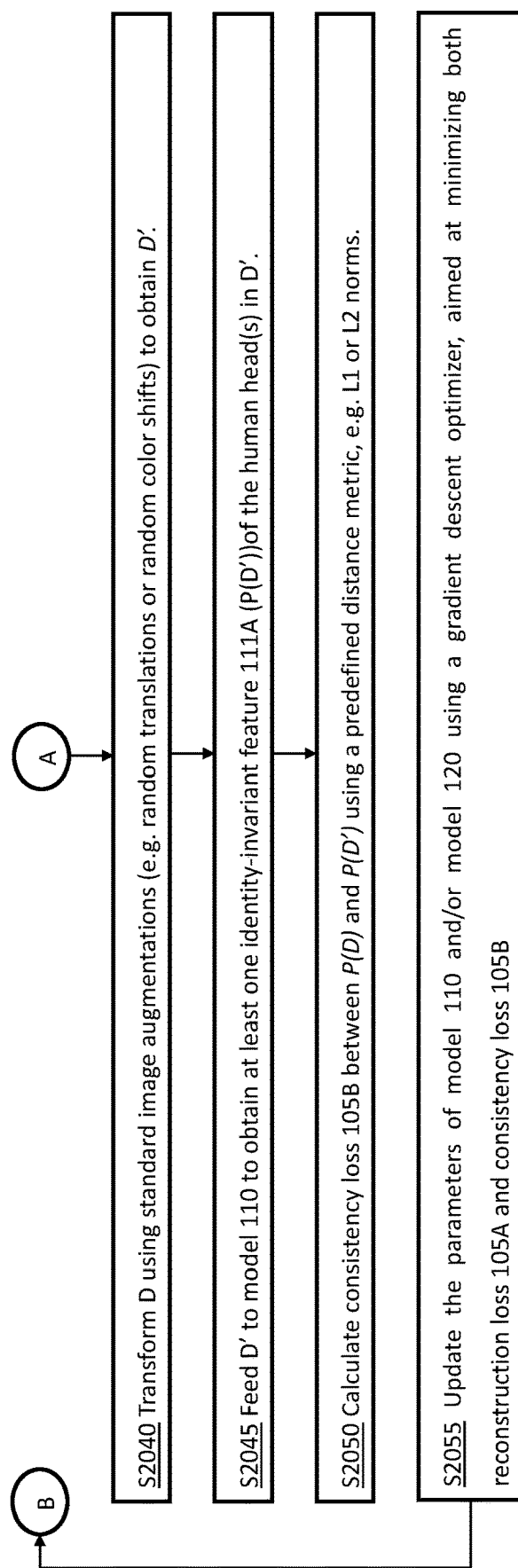

Reference is now made to FIGS. 5A and 5B, which are flow diagrams, jointly depicting an example of a method of training modules of system 100, by a processing unit (e.g., element 105 of FIG. 4), comprising one or more processors (e.g., element 2 of FIG. 1), to perform ANN based animation, according to some embodiments of the invention.

According to some embodiments of the invention, processing unit 105 may use a large dataset (DS) of video clips, depicting an object (e.g., a human head or face) to train the neural networks of feature model 110 and/or reconstruction model 120. The training process may run the following procedure iteratively or repeatedly, on training dataset DS, until a stopping condition is met, indicating that feature model 110 and/or reconstruction model 120 are brought to perform in a satisfactory level.

For example, the neural networks of feature model 110 and/or reconstruction model 120 may be trained in a self-supervised manner, as elaborated herein. A stopping condition may be a quality of reconstruction quality. For example, processing unit 105 may compute a difference (e.g., a difference in texture) between produced image 40 and target driver image (e.g., sampled data element 30' and/or augmented image 131, depending on the specific configuration of system 100). Alternatively, processing unit 105 may compute reconstruction loss 105A and/or consistency loss 105B and determine that networks 110 and/or 120 operate at a satisfactory level when loss values 105A and/or 105B are beneath a predefined value (e.g., the stopping condition). Additionally, or alternatively, processing unit 105 may compute the face movement accuracy. For example, processing unit 105 may compute a location of one or more facial landmarks (e.g., location of pupils, openness of eyes and/or mouth, etc.), of image 40 and target driver image 30', and may compare the values of these landmark locations to determine the face movement accuracy (e.g., the stopping condition), and hence determine whether networks 110 and 120 operate at a satisfactory level.

As shown in step S2005, processing unit 105 may sample a random video clip C from dataset DS.

As shown in steps S2010 and S2015, processing unit 105 may sample one or more random source (S) or puppet frames or images (e.g., element 20 of FIG. 2) from C, and sample a random driver (D) frame or image (e.g., element 30' of FIG. 2) from C. As the one or more frames or images (e.g., driver frame D and source frame S of FIG. 5A, or data elements 20 and 30' of FIG. 4 respectively) pertain to the same video clip C, the driver image D may also be referred to as a target image, in a sense that system 100 may be adapted to produce, from source image S, an output image that is equal or equivalent (e.g., according to a predetermined metric) to driver image D.

As shown in step S2020, processing unit 105 may feed or input image S to feature model 110 to obtain at least one first feature vector 111V. First feature vector 111V may include at least one first identity-invariant feature 111A, such as a pose feature 111A, a facial expression feature 111A and/or a lighting feature 111A of an object (e.g., the human head(s)) in S. The output of feature model 110, e.g., first feature vector 111V that includes the at least one identity-invariant feature 111A of image S, may be herein denoted P(S).

As shown in step S2025, processing unit 105 may feed or input image D to feature model 110 to obtain at least one second feature vector 111V. Second feature vector 111V may include at least one identity-invariant feature 111A, such as a pose feature 111A, a facial expression feature 111A and/or a lighting feature 111A of an object (e.g., the human head(s)) in image D. The output of feature model 110, e.g., second feature vector 111V, that includes at least one identity-invariant feature 111A of image D, may be herein denoted P(D).

As shown in steps S2030, processing unit 105 may feed or input image S, the one or more first identity feature vectors P(S) and the one or more second identity feature vectors P(D) as input data to reconstruction model 120. Reconstruction model 120 may subsequently produce, from this input data, an output image T. Output image T is denoted in FIG. 2 as output image 40.

According to some embodiments, and as shown in step S2035, processing unit 105 may subsequently calculate a value of a difference between image D and image T, using a predefined distance metric. This difference is commonly referred to in the art as reconstruction loss and is denoted in FIG. 4 as element 105A. For example, reconstruction loss data element 150A may be, or may include a two-dimensional array, where each entry of the array includes a value that represents a difference between image D and image T. The predefined distance metric may be any metric that is appropriate for measuring a difference between images as known in the art, including for example an L1 norm metric and/or an L2 norm metric.

It may be appreciated by a person skilled in the art that the training of feature model 110 and/or reconstruction model 120 may be accomplished by repeated iterations of steps S2005 through S2035 as elaborated above, followed by update of parameters or weights of feature model 110 and/or reconstruction model 120, until a stopping condition is met. The stopping condition may, for example, be met when reconstruction loss 105A does not surpass a predefined threshold value.

Additionally, or alternatively, training of feature model 110 and/or reconstruction model 120 may further include augmentation of at least one of image(s) D and/or image(s) S, as elaborated in the following steps.

As shown in step S2040, processing unit 105 may collaborate with augmentation module 130 of FIG. 4, to augment or transform image D, so as to obtain an augmented image D' (denoted in FIG. 4 as element 131). For example, augmentation module 130 may apply at least one standard image augmentation function 130' such as a translation or movement of one or more portions of image D, or a shift of a color in image D, to obtain image D' (e.g., element 131).

As shown in step S2045, processing unit 105 may feed or input augmented image D' to feature model 110, so as to obtain at least one identity-invariant feature 111A, such as a pose feature 111A, a facial expression feature 111A and/or a lighting feature 111A of an object (e.g., the human head(s)) in D'. The output of feature model 110, e.g., a feature vector 111V that includes at least one identity-invariant feature 111A of image D', may herein be denoted as P(D').

As shown in step S2050, processing unit 105 may calculate a difference between P(D) and P(D'), using a predefined distance metric. This difference is commonly referred to in the art as a consistency loss and is denoted in FIG. 4 as element 105B. The predefined distance metric may be any metric that is appropriate for measuring a difference between feature vectors (e.g., feature elements 111 of FIG. 4), such as elements P(D) and P(D') as known in the art. For example, the predefined distance metric may be or may include an L1 norm metric and/or an L2 norm metric.

As shown in step S2055, processing unit 105 may update the parameters of feature model 110 and/or reconstruction model 120 using a gradient descent optimization process or algorithm, such as the stochastic gradient descent (SGD) algorithm or the "ADAM" algorithm, as known in the art. According to some embodiments, the gradient descent optimization algorithm may be adapted to minimize at least one of reconstruction loss 105A and consistency loss 105B. Alternatively, the gradient descent optimization algorithm may be adapted to minimize both reconstruction loss 105A and consistency loss 105B.

According to some embodiments, system 100 may be adapted to specialize in animating a specific object, such as a face of a specific person having a specific identity (e.g., having specific identity features 111B). This identity may herein be denoted as 'I'.

Embodiments of the invention may improve the performance of system 100 in animating the specific object (e.g., a face pertaining to a specific human identity, I), by: (a) constructing a second dataset DS2 that may be a subset of dataset DS, and may include a plurality of video clips C pertaining only to the specific object (e.g., the specific face of identity I); and (b) fine-tune the training of feature model 110 and/or reconstruction model 120 by re-training feature model 110 and/or reconstruction model 120 on the video clips that are included in DS2, using the same training procedure as described above (e.g., in steps S2005 through S2055).

According to some embodiments, processing unit 105 may assign a first weight value to data instances such as video clips C that are included in training dataset DS2, and a second (e.g., smaller) weight value to data instances that are not included in dataset DS2. Processing unit 105 may then train feature model 110 and/or reconstruction model 120 while taking the weight values into consideration, so as to increase the specificity of system 100, or the performance of system 100 in relation to the specific object (e.g., face) of identity I.

For example, embodiments of the invention (e.g., ML models 110 and/or 120) may be initially trained using a diversified training dataset, that includes images and/or videos of a plurality of puppet objects and/or driver objects (e.g., faces pertaining to a plurality of people). ML models 110 and/or 120 may then be further trained and/or retrained, or have their training "fine-tuned", as commonly referred to in the art, so as to bias a specificity of the ML model 110 and/or ML model 120 in relation to specific objects (e.g., faces of a specific person). The term specificity may refer herein to an accuracy of produced output image 40, in relation to a ground-truth value (e.g. the value considered to be correct) of output image 40, given a specific object (e.g., faces of a specific person) depicted in source image 20.

In some embodiments, such bias of specificity may be accomplished by further training on a specific object. According to embodiments of the invention, bias of specificity may be accomplished by assigning a first weight value to a first source image 20 of a training dataset, depicting a first puppet object; assigning a second, different weight value to a second source image 20 of the training dataset, depicting a second puppet object; and training ML based reconstruction model 120 based on the first weight value and second (e.g., lower) weight value, to bias the specificity of the second ML model between the first puppet object and second puppet object. In this example, the specificity of ML model 120 may be referred to as "biased" in favor of the first puppet object.

As shown in FIG. 4, system 100 may include an ML-based segmentation module 150, adapted to segment source image 20, to produce therefrom a semantic segmentation map 150A, as known in the art. For example, source image 20 may include or depict a puppet object such as a human face. ML-based segmentation module 150 may be adapted to receive source image 20 of the puppet face and segment the image to produce a semantic segmentation map 150A. In this example, semantic segmentation map 150A may be or may include a two-dimensional array, where each entry of the array corresponds to a location (e.g., a pixel) in image 20, and is attributed a segmentation value 150A' that identifies it as pertaining to a segment or region of image 20. For example, a first segmentation value 150A' may identify a pixel of image 20 as pertaining to a background, a second segmentation value 150A' may identify a pixel of image 20 as pertaining to a forehead of a depicted person, and a third segmentation value 150A' may identify a pixel of image 20 as pertaining to an eye of a depicted person.

According to some embodiments of the invention, segmentation values 150A' may correspond to the prevalence or importance of respective pixels or regions in the production of identity-invariant features 111A. Pertaining to the same example, an identity-invariant feature 111A may be a facial expression feature. In this example, the first segmentation value 150A' (corresponding to a background region of image 20) may be a relatively small numerical value (e.g., 1, on a scale of 1-10), the second segmentation value 150A' (corresponding to a forehead region of image 20) may be an intermediate numerical value (e.g., 4), and the third segmentation value 150A' (corresponding to eyes in image 20) may be a relatively high numerical value (e.g., 9).

According to some embodiments, during a training stage, ML-based reconstruction model 120 may be trained so as to calculate transformation function 121 further based on semantic segmentation map 150A and/or segmentation value(s) 150A'. In other words, segmentation module 150 may assign a weight or segmentation value 150A' to one or more segments or regions of semantic segmentation map 150A, processing unit 105 may train ML-based reconstruction model based on the weights of the semantic segmentation map 150A.

For example, reconstruction module 120 may weight, or augment reconstruction loss 105A as calculated in step S2035 above, with additional loss metrics, based on semantic facial segmentation map 150A. For example, during training of reconstruction module 120, embodiments of the invention may assign a high weight to entries of reconstruction loss data element 105A that correspond to a high segmentation value 150A', e.g., to a high semantic importance, such as the eyes or mouth of a depicted person and assign a low weight to entries of reconstruction loss data element 105A that correspond to a low segmentation value 150A', e.g., to a low semantic importance, such as the background of the image. In other words, during the training process, a first transaction function 121 that imposes a specific value of reconstruction loss 105A in regions of high segmentation value 150A' may be heavily penalized in relation to a second transaction function 121 that imposes the same value of reconstruction loss 105A in regions of low semantic importance e.g., low segmentation value 150A'. Experiments have shown that applying such penalty, based on segmentation map 150A may improve the performance of system 100 when tested against various aspects of human face reconstruction known in the art, including for example facial landmarks localization and/or detection models.

When the neural networks of feature model 110 and reconstruction model 120 are trained, system 100 may be employed to perform ANN-based animation of an object such as a human face or head, that is depicted in image 20. According to some embodiments, system 100 may receive: one or more static, source head image data elements 20 (S) of an identity I to be animated and a video clip data element 30 (C) of the human head, from which identity-invariant 111A features (e.g., head pose, facial expression features, etc.) may be extracted and transferred to the animated output. The human identities I of source head image data elements 20 (S) and video clip data element 30 (C) may be different (e.g., depicting different people) or identical (e.g., depicting the same person).

Given both input data elements 20 and 30 as described above, processing unit 105 may execute the following procedure in order to create a target human head animation clip (V). This human head animation clip is denoted in FIG. 2 as output video 40'.

Processing unit 105 may feed or input image data elements 20 (S) to feature model 110, to obtain at least one first feature vector 111V that includes one or more identity-invariant 111A features (e.g., pose feature, facial expression feature) of the human head(s) depicted in S. The at least one first feature vector 111V may be denoted herein as P(S).

For one or more (e.g., all) image data elements 30 (D) in video clip C, processing unit 105 may utilize feature model 110 and reconstruction model 120 to generate an output image T (denoted as output data element 40 in FIG. 2). Processing unit 105 may generating output image T by: (a) feeding or inputting image data element 30 (D) to feature model 110 to obtain a feature vector 111 (denoted as P(D)) that includes one or more identity-invariant 111A features of the human head in D; and (b) providing S, P(S) and P(D) as input data to reconstruction model 120, to obtain a novel frame or image data element 40 (T).

As shown in FIG. 4, system 100 may include an appending module 170, adapted to append or assemble a plurality of output images 40 (T), to produce an output video data element 40' (V). For example, appending module 170 may append output images 40 in a timewise sequential order, so as to produce a video clip 40' that may be displayed on a screen (e.g., element 8 of FIG. 1) of a computing device (e.g., element 8 of FIG. 1) as temporally consistent (e.g., without "jerky" movements) video sequence.

In other words, for each sampled image 30' system 100 may generate a respective output image 40 depicting the puppet object (e.g., a first face) having a pose and/or lighting that is substantially identical to pose and/or lighting of a driver object (e.g., a second face) in sampled image 30', and having the same or substantially the same expression as the driver object. Appending module 170 may subsequently append or assemble the output images to generate output video 40'.

According to some embodiments, and as shown in FIG. 4, system 100 may include an anchor module 160, adapted to select at least one anchor image 161 from the plurality of sampled images 30'. Selected anchor image 161 may then be used to apply transformation function 121 on a puppet object depicted in source image 20, and produce an optimal corresponding output images 40, as elaborated herein.

For example, during a stage on inference, (e.g., after feature module 110 and reconstruction module 120 are trained), system 100 may receive a source image 20 depicting a puppet object such as a first face, and a video data element 30 depicting movement of a driver object such as a second face. As elaborated herein, embodiments of the invention may sample video data element 30 to produce a plurality of sampled images 30'. Additionally, or alternatively system 100 may receive the plurality of sampled images 30' of the driver object from a repository or database (e.g., element 6 of FIG. 1) of images.

According to some embodiments, anchor module 160 may compare values of one or more identity-invariant features 111A, pertaining to or describing one or more respective sampled images 30' (e.g., of the driver), to a value of an identity-invariant feature 111A (e.g., an identity-invariant feature included in feature vector 111V) pertaining to or describing image 20 (e.g., of the puppet). Anchor module 160 may then select an anchor image 161 from the one or more sampled images 30' based on the comparison.

As elaborated herein, at least one identity-invariant feature 111A may be a pose feature 111A. In such embodiments, anchor module 160 may select anchor image 161 by: calculating a value of a pose difference metric, between a first identity-invariant feature 111A of source image 20 and one or more second identity-invariant features 111A of sampled images 30', and selecting a sampled image 30' that corresponds to a minimal value of a pose difference metric as the anchor image 161. For example, identity-invariant feature 111A may be a pose feature 111A, and anchor module 160 may select sampled images 30' that corresponds to a first pose feature 111A that is most similar, according to any difference metric (e.g., L1, L2) to a pose feature 111A of source image 20. In other words, anchor module 160 may select a sampled image 30' of a driver object that has the most similar pose (e.g., location in image, yaw, pitch and roll) to that of source image 20. In another example, identity-invariant feature 111A may be a facial expression feature 111A, and anchor module 160 may select a sampled image 30' of a driver object that has the most similar facial expressions as that of source image 20.

As elaborated herein, at least one identity-invariant feature 111A may be a facial expression feature. In such embodiments, anchor module 160 may be configured to select the anchor image 161 by calculating a value of a facial expression difference metric, between first identity-invariant feature 111A, pertaining to or describing source image 20 and one or more second identity-invariant features 111A pertaining to or describing sampled images 30', selecting a sampled image 30' that corresponds to a minimal value of a facial expression difference metric as the anchor image 161.

For example, facial expression feature 111A may be a data structure or vector 111V that may include a plurality of facial landmarks of a person depicted in a respective image. Such landmarks may include, for example, a location of the pupils, a location of an edge of the eyes, a location of an edge of the nose, a location of an edge of the mouth, and the like. Anchor module 160 may receive a first facial expression feature 111A, including a first plurality of landmarks corresponding to a first image (e.g., source image 20) and a second facial expression feature 111A, including a second plurality of landmarks corresponding to a second image (e.g., a sample image 30').

Anchor module 160 may apply a similarity transformation function on a first subset of the first plurality of landmarks, to obtain a best fit of the first subset to a corresponding second subset of the second plurality of landmarks. For example, the first subset and second subset may pertain to edges of the mouth in the first image and second image, respectively. Anchor module 160 may apply a similarity transformation function, including for example rotation, translation, "scaling" "zooming in" and "zooming out" until a best fit between the subsets is achieved (e.g., until both mouths are best aligned) according to any appropriate difference metric (e.g., an L1 metric or Euclidean distance metric). Anchor module 160 may then calculate the facial expression difference metric based on at least one difference in distances between at least one first pair of landmarks of the first subset and a second pair of landmarks of the second subset. Pertaining to the example of landmarks defining edges of the mouth: anchor module 160 may compare the horizontal distances between the edges of the mouths, depicted in source image 20, and the one or more sampled images 30' (having undergone the similarity transformation) to select a sampled image 30' that depicts a similar mouth width as that of source image 20.

According to some embodiments, reconstruction module 120 may proceed to calculate transformation function 121 based on the selected anchor image 161.

For example, during an inference stage, reconstruction module 120 may receive a source image 20 depicting a puppet face, at least one first identity-invariant feature 111A (e.g., a first facial expression feature) pertaining to source image 20, and at least one second identity-invariant feature 111A (e.g., a second facial expression feature) pertaining to selected anchor image 161 (depicting a sample of a driver face). Thus, reconstruction module 120 may produce or reconstruct at least one output image 40, depicting a target face that has a facial expression which resembles that of the puppet face. Reconstruction module 120 may proceed to receive additional identity-invariant features 111A (e.g., pose features 111A) pertaining to sampled images 30', and subsequently produce (e.g. in cooperation with appending module 170) an animation video 40' depicting the target face, mimicking the facial expression of the puppet face, and following a movement of the driver face.

Figure 6:
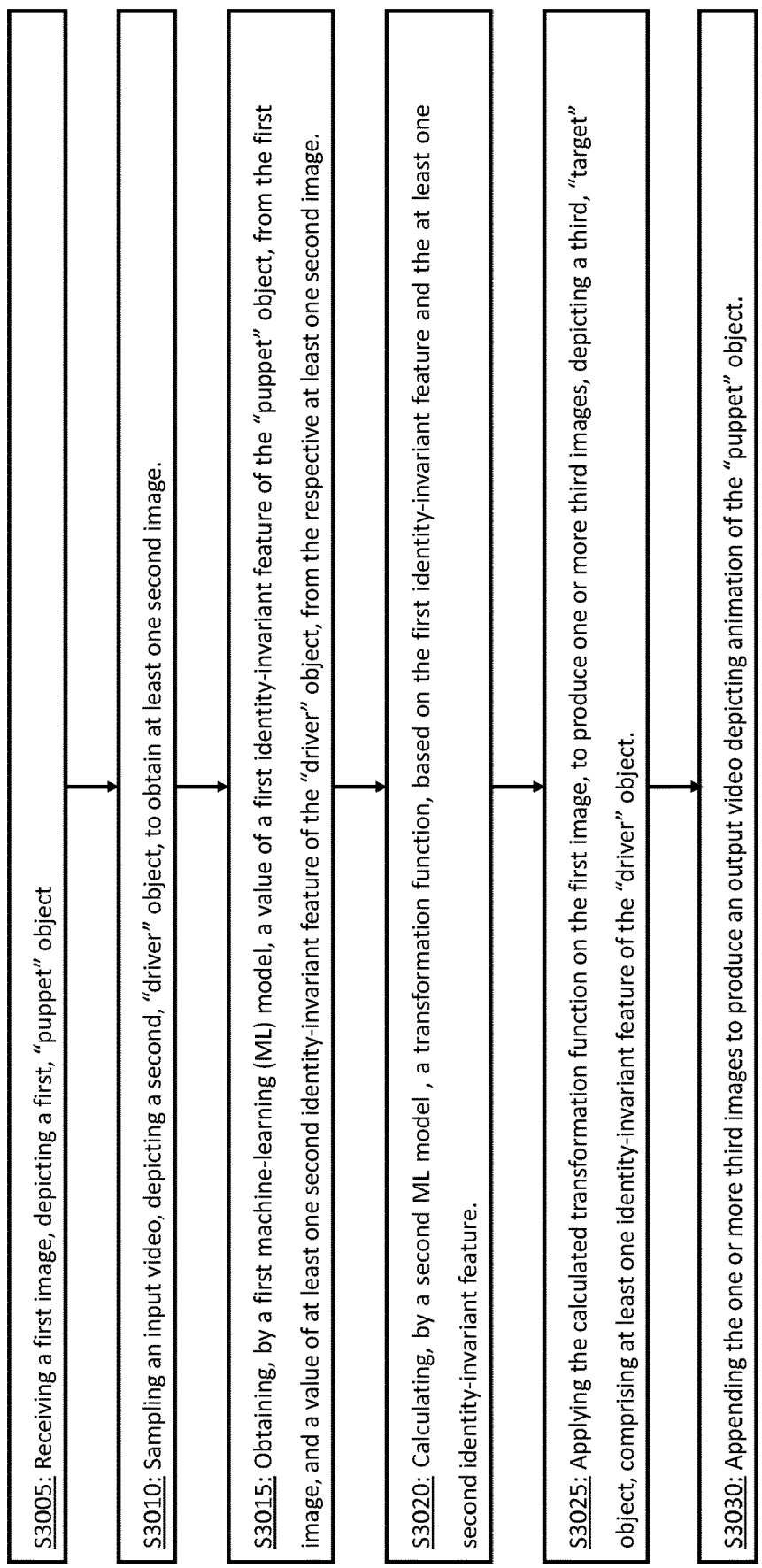
FIG. 6, is a flow diagram, depicting an example of a method of animating an image of an object by at least one processor, according to some embodiments of the invention.

Reference is now made to FIG. 6, which is a flow diagram depicting an example of a method of animating an image of an object by at least one processor, according to some embodiments of the invention.

As shown in step S3005, a first image may be received, the first image may depict a first, "puppet" object.

As shown in step S3010, an input video, depicting a second, "driver" object may be sampled, to obtain at least one second image.

As shown in step S3015, a first machine-learning (ML) model may obtain a value of a first identity-invariant feature of the "puppet" object, from the first image, and a value of at least one second identity-invariant feature of the "driver" object, from the respective at least one second image.

As shown in step S3020 a second ML model may calculate a transformation function, based on the first identity-invariant feature and the at least one second identity-invariant feature.

As shown in step S3025, the calculated transformation function may be applied on the first image, to produce one or more third images, depicting a third, "target" object, comprising at least one identity-invariant feature of the "driver" object.

As shown in step S3030, the one or more third images may be appended to produce an output video depicting animation of the "puppet" object.

Figure 7:
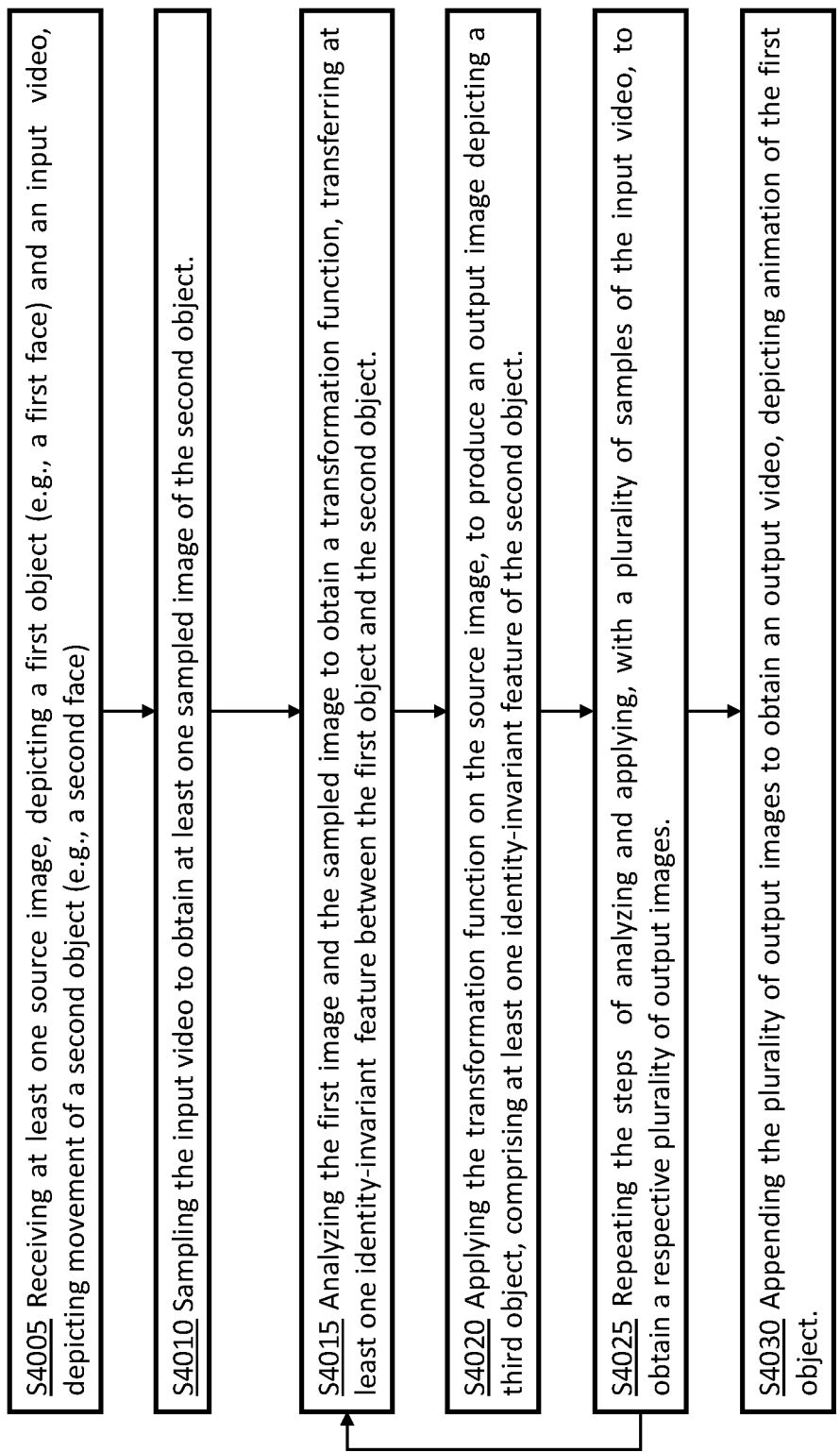
FIG. 7, is a flow diagram, depicting an example of a method of animating an image of an object by at least one processor, according to some embodiments of the invention.

Reference is now made to FIG. 7, which is a flow diagram depicting an example of a method of animating an image of an object by at least one processor, according to some embodiments of the invention.

As shown in step S4005 at least one source image and an input video may be received. The at least one source image may depict a first object (e.g., a first face) and the input video may depict movement of a second object (e.g., a second face).

As shown in step S4010, the input video may be sampled to obtain at least one sampled image of the second object.

As shown in step S4015, the first image and the sampled image may be analyzed to obtain a transformation function, transferring at least one identity-invariant feature between the first object and the second object.

As shown in step S4020, the transformation function may be applied on the source image, to produce an output image depicting a third object, comprising at least one identity-invariant feature of the second object.

As shown in step S4025, the steps of analyzing and applying may be repeated, with a plurality of samples of the input video, to obtain a respective plurality of output images.

As shown in step S4030, the plurality of output images may be appended to obtain an output video, depicting animation of the first object.

Embodiments of the invention include a practical application for automatically animating an image of a first object, based on one or more images depicted a second object.

Embodiments of the invention may include several improvements in technology of automated animation.

One such improvement is in the manner that ML models 110 and/or 120 may be trained in a two stage process, to improve specificity in relation to specific elements, including specific depicted objects and/or sceneries. Thus, system 100 may be utilized in two modes: By the first stage of training, embodiments of the invention may facilitate a first, "vanilla flavor" work mode for animating general, or any puppet object (e.g., any puppet face). In the second stage, by applying a different (e.g., higher) weight to a subset of specific objects (e.g., facial images depicting specific people), embodiments of the invention may facilitate a second work mode, in which system 100 may be specifically trained to animate the specific subset of puppet objects. It has been experimentally shown that the produced output images 40 of the specific subset of puppet objects may be of higher effective resolution, e.g., higher quality, improved motion tracking, in relation to that of images 40 produced for puppet objects that are beyond the subset of specified puppet objects.

Additionally, experimental results have shown that this dual stage training process may use the first stage as a "bootstrap" stage, and enable rapid training of the ML models 110 and/or 120 in the second stage, to produce the required output images 40 for the subset of specified puppet objects. The term "rapid" may indicate, in this context, a training process that may reach satisfactory results of training as known in the art, faster than, or using less epochs of training, and thus less computing resources, in relation to training ML models 110 and/or 120 by a training dataset that solely includes the subset of specific puppet objects. Embodiments of the invention may allow further training the entire network after it was already trained, the additional training may be done on a specific person with purpose to improve the quality on this person, e.g., on account of reduced quality on others. Such a process may reduce the training time.

Another improvement provided by embodiments of the invention may include the inclusion of semantic segmentation maps 150A in the training process, as elaborated herein. Experimental results have shown that this form of training may result in output images 40 and/or output video 40' that may appear of higher quality to a human viewer, and/or achieved by less training epochs, in relation to training that is devoid of semantic segmentation maps' information.

Another improvement provided by embodiments of the invention may include the structure of ML-models 110 and 120 as a U-Net neural network configuration. It has been shown experimentally, that such NN structure may result in improved effective resolution in relation to currently available methods and systems for animating puppet objects, for example by using an encoder-decoder NN structure, or by implementing graphical methods such as face swapping, as known in the art.

Another improvement provided by embodiments of the invention may include the selection of an optimally fit "anchor" image 161, from a plurality of sampled driver images to be applied as a basis for animating a puppet object. Experimental results have shown that the use of anchor images may improve the animation of puppet objects, in the view of a human observer. This improvement may include for example a video which may appear to a human viewer as more temporary consistent, and that includes less noise artifacts, in relation to currently available methods of animation that do not employ such fitting of an anchor image, as elaborated herein.

Embodiments of the invention may implement one or more three-dimensional (3D) techniques or methods that may use a 3D model, e.g., of a face, and a rendering engine to render the face with a desired pose and expression. The 3D methods may be used in addition to the 2-Dimensional (2D) techniques described in some embodiments of the invention, e.g., which use warping of a 2D image to reproduce a face with a new pose. According to embodiments of the invention, a 3D rendering engine may be used for creation of a target image based on a driver image in any desired pose and expression and may enable anonymizing and reenacting an image based on a driver video.

According to embodiments of the invention, 3D methods may implement 3D modeling of a scene which may enable rendering of a target image in any desired pose and with any desired lighting. 3D modeling of a scene may be used, for example, when a target image has large pose differences from a driver image or when there are different lighting conditions or in any other situation in which using a 2D technique may result with artifacts or changes with respect to the desired result.

According to embodiments of the invention, 3D information may be extracted from a video of a driver object and from an image of a puppet object. The 3D information may include features, parameters, characteristics, or attributes that relates to a 3D representation of one or more elements in an image, e.g., lightening, reflectance, illumination, textures and the like. For each video frame of the driver video, embodiments of the invention may find a correspondence between a driver image from the driver video and a puppet or target image. Using the 3D information and the correspondence between a driver image from the driver video and a puppet or target image, a new image may be rendered. The rendered image may have features related to the driver object, e.g., a pose and expression of the driver object while other features may be taken from the puppet image, e.g., texture, reflectance and illumination of the target image. In some embodiments, a mixing model may mix or blend the rendered image to a desired background using input information, 3D information and/or by generating missing information for occluded areas.

According to some embodiments of the invention, the 3D information may be received and may be used as an additional input to the one or more machine-learning models. For example, embodiments of the invention may use both two-dimensional techniques, e.g., as described in FIGS. 2-7 which may use the correspondence between a driver object and a puppet object to create a warping field and a 3D rendered image as inputs to a mixing model as described in FIGS. 8-11. Embodiments of the invention may implement or include differentiable modules, blocks and/or element to enable the use of a data driven approach and training of deep learning models to implement the invention.

Figure 8:
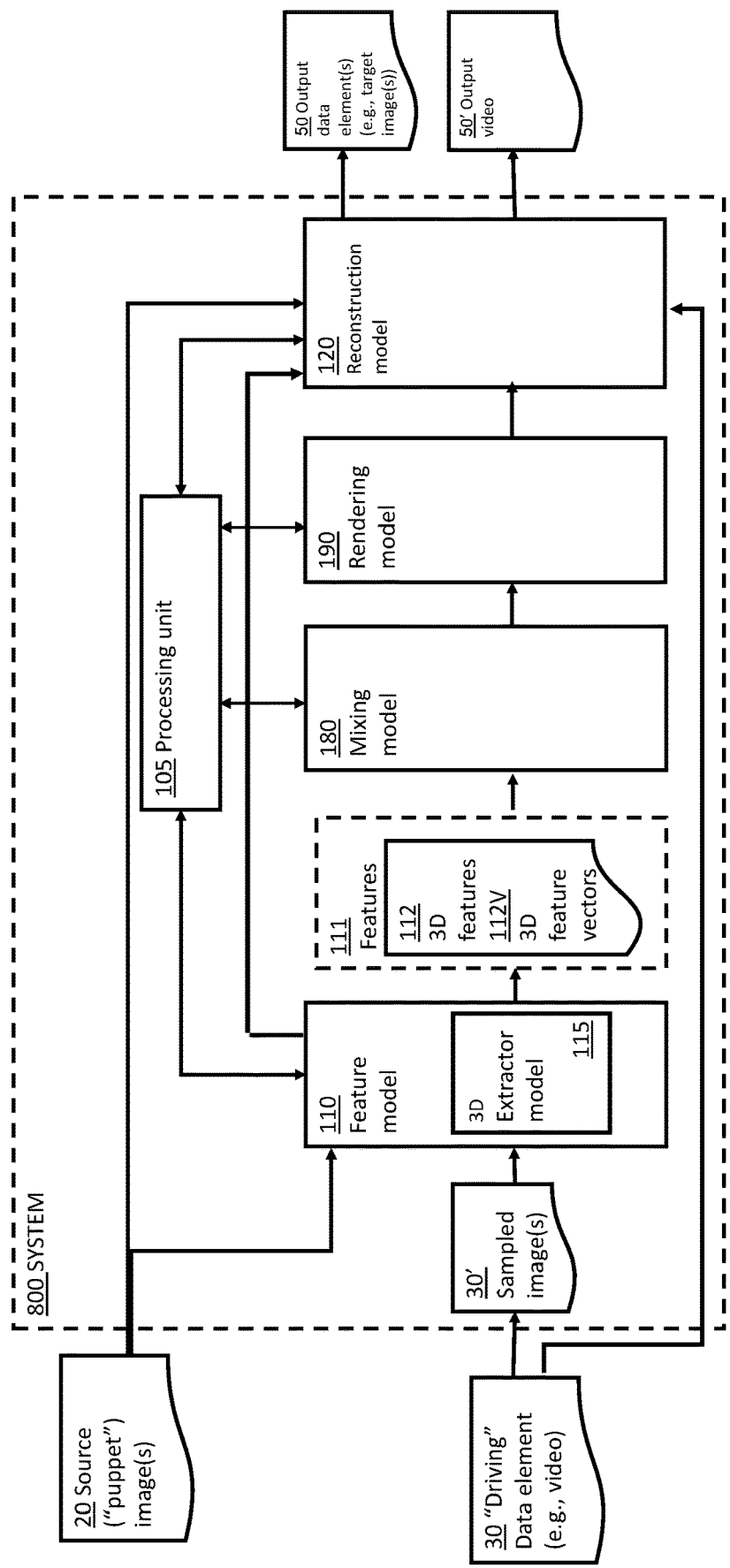
FIG. 8 is a block diagram, depicting an example of a system for ANN based animation including 3D methods, according to some embodiments of the invention.

Reference is now made to FIG. 8, which is a block diagram, depicting a system 800 for ANN based animation including 3D methods, according to some embodiments of the invention. System 800 may be implemented as a software module, a hardware module or any combination thereof. For example, system may be or may include a computing device such as element 1 of FIG. 1 and may be adapted to execute one or more modules of executable code (e.g., element 5 of FIG. 1) to perform animation of at least one image, as further described herein.

According to embodiments components, units, block or elements of system 800 presented in FIG. 8, are carried out similarly as described elsewhere herein, e.g., as described in FIG. 2. Additional elements, e.g., 3D extractor model 115, 3D features 112, mixing model 180 and rendering model 190 may be added to embodiments of the method and system presented in FIG. 2. It should be understood to a person skilled in the art that the system and methods described with reference to FIG. 8 and FIG. 9 may be carried out similarly as described elsewhere herein and may further carry out other methods additionally and/or alternatively.

According to some embodiments of the invention, system 800 may include an ANN-based feature model 110 which may include a 3D extractor model 115. Feature model 110 may be adapted to receive at least one data element such as a source image 20 depicting a puppet object and/or one or more driving images 30, for example, included in a video data depicting a driver object. Feature model 110 may extract from the at least one data element 20 and/or 30 one or more features 111, as described with reference to FIGS. 1-7. Additionally, or alternatively, feature model 110 may extract by 3D extractor model 115 3D features from input images, e.g., data element 20 and/or 30.

3D extractor model 115 may extract, determine or predict from the at least one data element 20 and/or 30 at least one 3D feature vector 112V. The 3D feature vector 112V may be or may include a set or group of one or more 3D features 112 related to 3D information included in the at least one image data element 20 and/or data element 30. For example, at least one data element 20 and/or data element 30 may be an image of an object, and the one or more 3D features 112 may represent characteristics, attributes or features related to a 3D representation of the depicted object.

Feature vector 112V may be an ordered series of numbers, each representing a feature, attribute, characteristic, or a parameter relating to the 3D representation of data included in input image 20 and/or input image 30. For example, the feature may include a 3D representation of an object included in the image and/or background, lightening, texture, reflectance, illumination or any other information which may relate to 3D representation of data included in input images 20 and/or 30. According to some embodiments of the invention, additionally and/or alternately feature model 110 may extract from the at least one data element 20 and/or 30 at least one feature vector 111V including a set or group of one or more features 111 as described with reference to FIGS. 1-7.

ML-based 3D extractor model 115 may be trained to predict, determine and extract at least one 3D feature 112 pertaining to a face included in data elements 20 and/or 30, such as a pose feature, an expression feature, a lighting feature, texture feature, illumination feature and/or a point of view feature which may be presented as a 3D feature 112 or 3D feature vector 112V. A prediction and extraction of one or more 3D features may be based on a first training stage of ML based 3D extractor model 115. According to some embodiments of the invention, processing unit 105 may be adapted to train feature model 110 and 3D extractor model 115. For example, processing unit 105 may be adapted to train 3D extractor model 115 to predict and extract, based on a training dataset comprising a plurality of source images depicting puppet objects and a plurality of source images sampled from video clips depicting driver objects. Predicting a 3D feature may include analysis of elements or objects presented in a 2D image and identifying objects or elements that represent 3D objects in the real world, e.g., not in the image, e.g., a face, an object, an animal, and the like.

According to some embodiments, an object depicted in image 20 and/or data element 30 may be a human face or head, and the one or more 3D features 112 may include 3D identity-related features, representing characteristics pertaining to a 3D representation identity (e.g., the identity of a person whose face is depicted). Additionally, or alternatively, the one or more 3D features 112 may include 3D identity-invariant features, that may not represent 3D characteristics pertaining to identity, as elaborated herein.

The term "3D feature" may be used herein to refer to a measurable property of an input data element in 3D representation. For example, in an embodiment where data element 20 is an image depicting an object, such as a face, a 3D feature vector 112V of data element 20 may include, for example a data structure, such as a vector of 3D features 112 represented as numerical elements. 3D features 112 may represent or describe specific properties of the depicted face as depicted or described in 3D space. 3D features 112 may for example include 3D identity-related features, that may indicate aspects of a person's identity (e.g., age, gender, ethnicity, etc.). 3D features 112 may further include 3D identity-invariant features that may relate to other characteristics of the object or face which do not indicate or represent aspects of a person's true identity. For example, clothing, position, pose, expression, and the like. The 3D identity-invariant features may further include features that may relate to other characteristics of the input image which may not relate to the object depicted in the image, for example, scene, environment, background, lightening, illumination and the like.

In some embodiments, 3D feature vector 112V may be expressed by, or emitted as an output layer of neural nodes of feature model 110 and/or 3D extractor model 115, however it may be clear to a person skilled in the art that other implementations for extracting 3D feature vector 112V and/or 3D features 112 may also be possible.

The term "3D identity feature" or "3D identity-related feature" may be used herein to refer to a data structure (e.g., a 3D feature vector 112V) that may represent one or more 3D features or characteristics of an object such as a face depicted in an image, and may be used (e.g., by a face recognition (FR) ML-based model, as known in the art) to identify the object. For example, an identity feature may include a representation of facial characteristics or properties such as age, gender, ethnicity, complexion, geometry of facial organs (e.g., length of nose, distance between the eyes, etc.) and the like, which may be used by a FR model to determine whether a depicted face pertains to a first person or to a second person.

The term "3D identity-invariant feature" vector may be used herein to refer to a data structure (e.g., a 3D feature vector 112V) that may represent one or more features or characteristics of an object depicted in an image, but may nevertheless not facilitate identification of the object, or distinction of the object among other objects of the same type or category. Exemplary 3D identity-invariant feature may a) directly related to characteristics of an object, e.g., clothing, position, pose, expression, and b) related to other characteristics of the input image (not directly related to characteristics of an object), for example, characteristics of the scene or environment depicted in the image, e.g., background, lightening, color, surrounding, illumination and the like.

According to some embodiments, element 20 and/or element(s) 30 may be an image depicting an object, such as a human body, or a face. Feature model 110 and/or extractor model 115 may be adapted to extract a 3D feature vector 112V that includes a value of at least one 3D identity-invariant feature. For example, the at least one 3D identity-invariant feature may be a pose feature, representing a pose of the object in the image, an expression feature, representing an expression of a face depicted in the image. Additionally, or alternatively, feature model 110 and/or extractor model 115 may be adapted to extract a 3D identity-invariant feature such as a lighting feature, representing a lighting of the object (e.g., the car, the face) in the image.

It may be appreciated that identity-invariant feature such as the aforementioned pose feature, expression feature and lighting feature may describe or represent a characteristic of a depicted object such as face in an image but may nevertheless not facilitate identification of the object (e.g., the face). For example, knowledge of one or more 3D identity-invariant features may not suffice to enable identification of a depicted person, or a depicted object from objects of the same type (e.g., faces of other people). According to some embodiments, feature model 110 and/or extractor model 115 may be adapted to extract a value of a first 3D identity-invariant feature of a puppet object, from data element 20 (e.g., a first image) and a value of at least one second 3D identity-invariant feature of a driver object, from respective at least one second data elements 30 (e.g., images).

According to some embodiments, system 800 may receive a first image 20 depicting a face, and a video data element 30 depicting movement of a second face. System 800 may sample video data element 30 to obtain at least one sampled image of the second face and analyze the first image and the at least one sampled image to obtain and to extract, for each image, a plurality of 3D features 112, such as a pose feature, an expression feature, a point of view feature and a lighting feature, as elaborated herein. System 800 may subsequently generate, based on the obtained features, an output video 50, depicting movement of the first face, that is substantially identical to movement of the second face and having the same expression and/or lighting as the second face, as elaborated herein.

According to some embodiments of the invention, a first machine-learning (ML) model implemented by feature model 110 and/or extractor model 115 may obtain a value of a first 3D identity-invariant feature of the puppet object, and a value of a second 3D identity-invariant feature, from the at least one second image. The first machine-learning (ML) model may find, calculate, determine or assess a correspondence between the first 3D identity-invariant feature of the puppet object, and the second 3D identity-invariant feature, of the driver object. Additionally, or alternatively, 3D extractor model 115 may further extract a plurality of additional 3D features from the first image, e.g., related to a puppet object and additional 3D features from the second image, e.g., related to a driver object and/or related to an environment or a scene related to the driver object, by a first ML based model.

According to some embodiments of the invention, mixing model 180 may calculate, by a second ML model, also referred to herein as a "mixing model", a mixing function. The mixing function may define a specific combination based on the first 3D identity-invariant feature of the puppet object and the second 3D identity-invariant feature of the driver object. Calculating the mixing function may include assigning a first weight value to the 3D identity-invariant feature of the puppet object and assigning a second weight value to the second 3D identity-invariant feature of the driver object. Assigning or determining the first weight value and the second weight value may be according to a predetermined objective of the mixing process which relates to required characteristics, or profile of the target object.

Mixing model 180 may further apply the mixing function on the plurality of 3D features extracted by 3D extractor model 115. Applying the mixing function may include assigning the first weight value to the plurality of 3D features extracted from the first image relate to the puppet object and assigning the second weight value to plurality of 3D features extracted from the second image relate to the driver object. In some embodiments of the invention, the plurality of 3D features extracted from the first image may be considered as a first set also referred to herein as a "super set" of features while the plurality of 3D features extracted from the second image may be considered as a second "super set" of features. The mixing function may be applied on the first and second "super set" of features by assigning the first weight value to the first "super set" of features extracted from the first image and the assigning the second weight value to the second "super set" of features extracted from the second image. Alternatively, or additionally, the mixing function may be applied on one feature from the plurality of 3D features extracted from the first image and on one feature from the plurality of 3D features extracted from the second image. The one feature from the plurality of 3D features extracted from the first image may correspond to the one feature from the plurality of 3D features extracted from the second image. Applying the mixing function may combine the first and the second set of features or features from the first and second images to create a single mixed set of features or a mixed feature.

According to some embodiments of the invention, rendering model 190 may implement a third ML model, also refereed herein to "rendering model". Rendering model 190 may generate or create by the third ML model a rendered image, based on the plurality of 3D features extracted by model extractor 115, the first 3D identity-invariant feature (related to a puppet object) and the second 3D identity-invariant feature (related to a driver object). Using the 3D information and the correspondence between the first 3D identity-invariant feature and the second 3D identity-invariant feature, a new image may be rendered or created. The rendered image may have feature related to the driver object, e.g., a pose and expression of the driver object while other features may be taken from the puppet image, e.g., texture, reflectance and illumination of the target image.

Reconstruction model 120 may generate, by a fourth ML model one or more output images 50 based on the created rendered image, the plurality of 3D features, the first input image and the second input image. The one or more output images may be further appended to produce an output video 50' depicting animation of the puppet object based on the driver image.

ANN-based reconstruction model 120 may be adapted to generate an output data element 50 such as an image of an object (e.g., a face), given a source data element 20 (e.g., an image of a puppet face) and a feature vector that includes at least one 3D feature 112 (e.g., a 3D identity-invariant feature) of a driving data element 30 (e.g., an image of a driver face). For example, given a source data element 20 that is an image of a source face to animate, and one or more driver data elements 30 such as images of a driver face 30, extractor model 115 may extract at least one 3D identity-invariant feature such as a pose feature, for one or more (e.g., each) of source image 20 and driver image(s) 30.

Reconstruction model 120 may receive as inputs a rendered image from rendering model 190 and the plurality of 3D features extracted from a first image of a puppet object and from one or more second images of a driver object, e.g., from a video of driver object. In addition, reconstruction model 120 may further receive as an input the original source data element 20 (e.g., an image of a puppet face) driving data element 30 (e.g., an image of a driver face)

Reconstruction model 120 may be adapted to generate a new output image, depicting the puppet face of source image 20, having a 3D identity-invariant feature of the driver face, e.g., a pose, an expression depicted in driver image(s) 30 while having 3D characteristics or features of the source image, e.g., reflectance, texture, illumination. In some embodiments of the invention, reconstruction model 120 may blend the rendered image to a desired background using input information, 3D information and/or by generating missing information for occluded areas. For example, reconstruction model 120 may add fine details according to what was learned in a training stage to the image.

According to some embodiments of the invention, feature model 110, extractor model 115, mixing model 180, rendering model 190, and reconstruction model 120 may be trained jointly in a self-supervised manner as elaborated herein, for the task of image (e.g., image of a human head) reconstruction. Once fully trained, feature model 110, extractor model 115, mixing model 180, rendering model 190, and reconstruction model 120 may be used for the task of animation (e.g., human head animation), as elaborated herein. It should be understood to a person skilled in the art that processing unit 105 may be connected or associated with each of the ML-based models, e.g., feature model 110, extractor model 115, mixing model 180, rendering model 190, and reconstruction model 120 and may be used to process, analyze, train or perform any processing operation required for a ML based method or algorithm.

According to some embodiments, feature model 110, extractor model 115, mixing model 180, rendering model 190, and reconstruction model 120 may jointly be or include a U-Net neural network configuration. A U-net NN may be a convolutional NN where multi scale skip connections are used to concatenate features at different scales, e.g., one or more bottleneck connections may be replaced with one or more multi scale skip connections. For example, a U-net NN may include of down sampling blocks and/or up sampling blocks that may be connected with residual connections. The residual connections may pass information "as is" and therefore when a puppet and a driver are not aligned, the motion information may be collaborated in the residual connections, e.g., a motion formulation may be used to transform the information in each of the residual connections.

Figure 9:
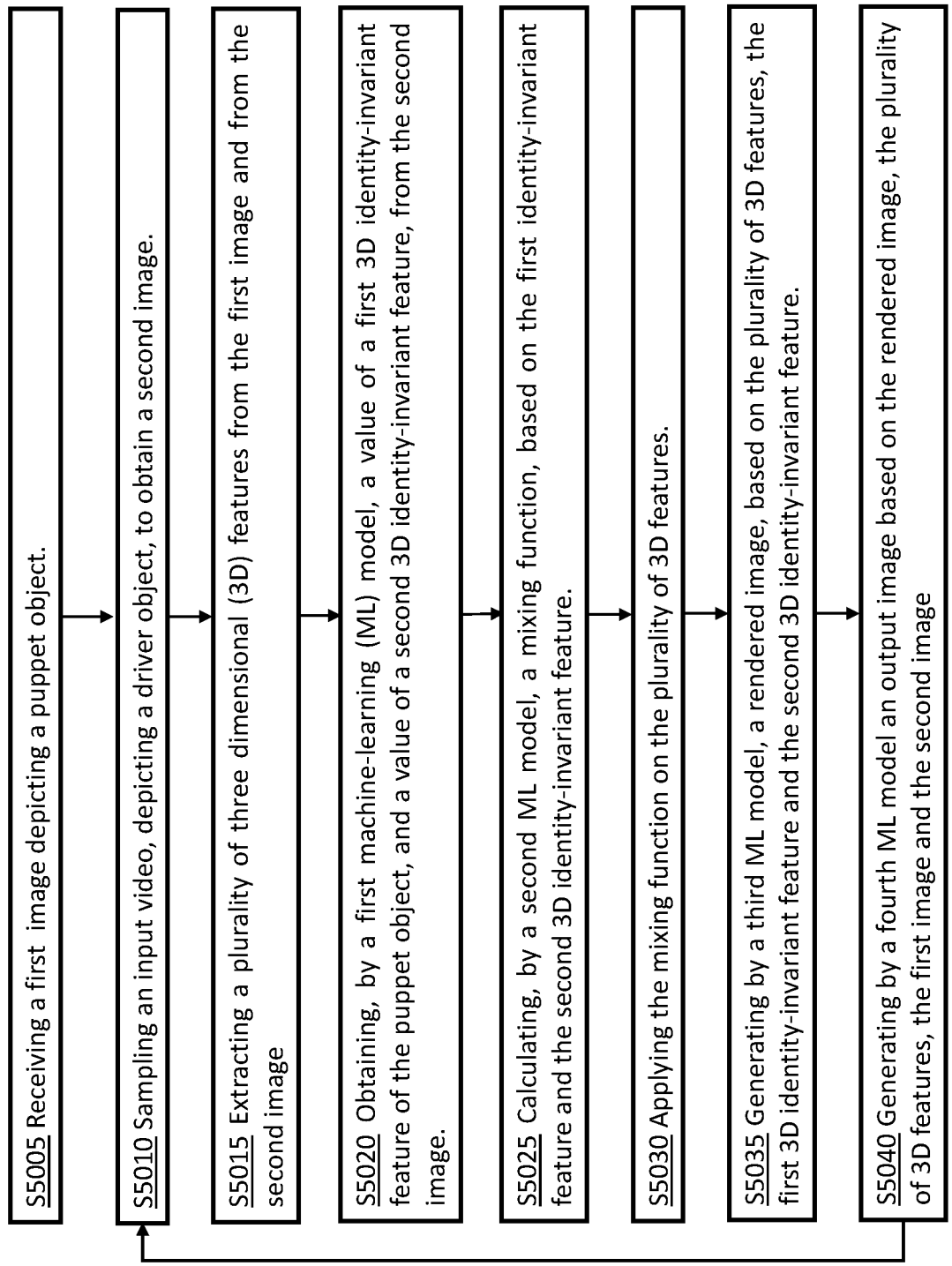
FIG. 9 is a flow diagram, depicting a method of ANN based animation including 3D methods, according to some embodiments of the invention.

Reference is now made to FIG. 9, which is a flow diagram, depicting a method of ANN based animation including 3D methods, according to some embodiments of the invention. The method of ANN based animation described herein may be implemented by a processing unit (e.g., element 105 of FIG. 8) comprising at least one processor (e.g., element 2 of FIG. 1), according to some embodiments of the invention.

As shown in step S5005, processing unit 105 may receive at least one source image (e.g., source data element 20 of FIG. 8), depicting a first object such as a source or puppet face, and an input video, (e.g., driver data element 30 of FIG. 8), depicting movement of a second object such as a driver face. The input video may be a movie (e.g. moving image) including a series of still images played at a speed such that a viewer perceives a moving image.

As shown in step S5010, processing unit 105 may sample the input video data element 30, to obtain a sampled image 30' of the second object, the image being part of the video. For example, the sampled image may be an image taken from the video which depicts the driver face, in a specific pose, presenting a specific expression, and shown at specific lighting conditions, as shown in the video data element at a specific point in time.

As shown in step S5015, ML-based 3D extractor model 115 may be adapted to receive the first image and the one or more second images sampled from the input video. ML-based 3D extractor model 115 may be trained to extract a plurality of 3D features from the first image and from a second image, e.g., the second image being sampled from the input video. The 3D features, e.g., 3D features of FIG. 8 may be represented as 3D feature vectors, e.g., 3D feature vectors 112V of FIG. 8. The 3D features may be or may include 3D information related to a representation of an object in at least one image data element 20 and/or data element 30. For example, at least one data element 20 and/or data element 30 may be an image of an object, and the one or more 3D features 112 may represent characteristics, attributes or features of the depicted object or related to the depicted object. Additionally, or alternatively 3D features 112 may include a 3D representation of a parameter or attribute related to data included in input image 20 and/or input image 30 and not directly to the object, e.g., background, lightening, texture, reflectance, illumination, or any other 3D information.

ML-based 3D extractor model 115 may develop or build a mathematical coordinate-based representation of any surface of an object of an input image in three dimensions. The 3D models used by extractor model 115 may represent a physical body or object by using a collection of points in 3D space, connected by various geometric entities such as triangles, lines, curved surfaces, and the like.

As shown in step S5020, ML-based feature model 110 and/or ML-based 3D extractor model 115, also referred to herein as a first ML model, may be adapted to obtain a value of a first 3D identity-invariant feature of the puppet object, and a value of a second 3D identity-invariant feature, from the second image, e.g., of the driver object. The 3D identity-invariant feature of an object depicted in the first image, e.g., the puppet object may include for example, a pose feature, representing a pose of an object (e.g., a face, a car) in an image, and/or a lighting feature, representing a lighting of the object (e.g., the face, the car) in the image. Additionally, or alternatively, in embodiments where the depicted object is a face, feature model 110 and/or extractor model 115 may be adapted to obtain a feature that includes at least one 3D identity-invariant feature that is an expression feature, representing an expression of the face depicted in the image.

As shown in step S5025, ML based mixing model 180, also referred to herein as a second ML model, may calculate a mixing function based on the first 3D identity-invariant feature and the second 3D identity-invariant feature obtained by the first ML model, e.g., 3D extractor model 115. The mixing function may include or define a combination between the first 3D identity-invariant feature and the second 3D identity-invariant feature. Calculating the mixing function may include assigning, by the second ML model, a first weight value to the first 3D identity-invariant feature and assigning, by the second ML model, a second weight value to the second 3D identity-invariant feature. The first and second weight values may be determined based on a training stage in which the ML based mixing model 180 may be trained as to find, discover, learn and determine optimal first and second weight values that may lead to optimal results of mixing between the first 3D identity-invariant feature of the first object and the second 3D identity-invariant feature of the second object. The second 3D identity-invariant feature may be related to a scene depicted in the second image. The first and second weight values may be determined based on a predetermined objective of the mixing process. For example, the first and second weight values may be determined according to a required influence of an object from the first image and according to a required influence of an object from the second image.

As shown in step S5030, ML based mixing model 180 may apply the mixing function, determined with relation to the first 3D identity-invariant feature and the second 3D identity-invariant feature in step S5025, on the plurality of 3D features extracted by the ML-based 3D model extractor 115 in step S5015. By applying the mixing function on the plurality of 3D features, the plurality of 3D features extracted from the first image and the plurality of 3D features extracted from the second image may receive a respective weight value which may transform the plurality of 3D features to receive an optimal value for the animation process.

As shown in step S5035, ML based rendering model 190 may receive the plurality of 3D features after the mixing function has been applied to them and in addition may receive the first 3D identity-invariant feature and the second 3D identity-invariant feature. The ML based rendering model 190, also referred to herein as a third ML model, may generate a rendered image, based on the plurality of 3D features, the first 3D identity-invariant feature and the second 3D identity-invariant feature. Rendering model 190 may simulate, create, produce or generate visual effects, e.g., illumination, lens flares, depth of field or motion blur in order to simulate visual phenomena resulting from the optical characteristics of cameras and of the human eye. These effects may add element of realism to a scene, even if the effect is merely a simulated artifact of a camera. A rendered image may include a high-resolution image which depict the puppet image face embedded with the 3D identity-invariant features of the second, driving, video. For example, the rendered image may include a back projection of 3D texture of an object using a light model on the image plane.

As shown in step S5040 ML based reconstruction model 120, also referred to herein as a fourth ML model may generate output images based on the rendered image, the plurality of 3D features, the first image and the second image, wherein the one or more output images depict a target object comprising at least one 3D identity-invariant feature of the driver object. The 3D identity-invariant feature of the driver object may be related to a scene depicted in the second image. The ML based reconstruction model 120 may receive the rendered image from rendering model 180 and may refine, improve, enhance and/or enriched the image such as to produce an output image which has higher quality than the rendered image. Generating the improved output image may include use of additional data or information which may be based on the plurality of 3D features, the first image and the second image and based on statistical models which may be used for training of reconstruction model 120.

ML-based reconstruction model 120 may implement a transformation function that may associate or transform between input data and output data. In this context, reconstruction model 120 may be regarded as implementing a transformation function that associates between: (a) a source image 20, a sampled image 20', one or more 3D features pertaining to source image 20, and one or more 3D features pertaining to sampled data elements 30' and the rendered image as an input, and (b) image 40 as an output.

According to some embodiments, during a training stage, ML-based reconstruction model 120 may be trained to produce, calculate, or implement a transformation function, based on a first 3D identity-invariant feature of the puppet object, and a second 3D identity-invariant feature, e.g., of a driver, from a second image. During an inference stage, ML-based reconstruction model 120 may implement transformation function on at least one input image 20, to obtain one or more output or target images 40, depicting a target object. The target object may include at least one 3D identity-invariant feature of the driver object, depicted in the one or more driving images 30. The target image may depict a third object (e.g., a third face), that may include a mixture 3D features included in the feature vectors 111V of the first object and second object.

According to embodiments of the invention, reconstruction model 120 may be trained to implement a transformation function that may transfer at least one 3D identity-invariant feature from the face of image 30' to the face of image 20. For example, reconstruction model 120 may produce an output image 40, which may depict a third face. The third face may have at least one 3D identity feature of the first face of image 20. For example, the third face may be recognizable (e.g., by a human observer, by a face-recognition module, and the like) as pertaining to or belong to the same person as the first face. Nevertheless, the third face of output image 40 may have at least one 3D identity-invariant feature (e.g., pose, expression, feature, lighting, point of view and the like) as that of sampled image 30'. For example, the third face depicted in output image 40 may have an expression 3D feature value that is substantially equal to (e.g., according to some predefined metric) the expression feature value of the face depicted in sampled image 30'. In other words, the face depicted in output image 40 may be recognizable (e.g., by an FR algorithm) as the same face depicted in image 20, but may portray the same expression, lighting and/or pose as the face depicted in sampled image 30'. In other words, output image 40 may include a 3D pose feature equivalent or equal to the 3D pose feature of sampled image 30', a 3D expression feature equivalent or equal to the 3D expression feature of sampled image 30', and/or a 3D lighting feature equivalent or equal to the 3D lighting feature of the sampled image 30'.

Some embodiments of the invention may include repeating the steps of obtaining (S5020), calculating (S5025), applying (S5030), generating (S5035) a rendered image and generating (S5040) an output image to a next output images, based on the rendered image, the plurality of 3D features, the first image and a respective image from a plurality of sampled images of the input video. Embodiments of the invention may further include appending the next output image to the previous output image to produce an output video depicting animation of the puppet object. During the process of repeating the steps a plurality of images may be generated and each generated image may be appended, combined or assembled to the previous generated output images, e.g., data elements 40 by, for example, processing unit 105. A new generated image may be added to a video being assembled, to produce or obtain an output video, e.g., output video 40'. For example, appending module 170 may append output images 40 in a timewise sequential order, to produce a video clip 40' that may be displayed on a screen.

According to embodiments of the invention ML based models, such as models implemented by artificial NNs, may be regarded as implementing a function, associating between input data and output data. According to embodiments of the invention, each of the ML-based models, e.g., feature model 110, extractor model 115, mixing model 180, rendering model 190, and reconstruction model 120 and may implement a differentiable function whose derivative exists at each point in the domain. For example, ML based rendering model 180 may implement a differentiable rendering function which may be learned with data, one gradient descent step at a time to allow learning a rendering function statistically through data.

According to embodiments of the invention, Processor 105 may process and/or analyze the first image and the sampled image to obtain a transformation function, adapted to receive a first data element such as an image depicting a first object, and produce a second data element such as a second image depicting a second object, while transferring at least one 3D identity-invariant feature between the first object and the second object.

It may be appreciated by a person skilled in the art, that ML-based reconstruction model 120 of FIG. 8 may be regarded as implementing a transformation function, that associates or transforms between input data and output data. In this context, reconstruction model 120 of FIG. 8 may be regarded as implementing a transformation function that associates between: (a) a source image 20, a plurality of 3D features pertaining to source image 20, and to a sampled data elements 30', a rendered image on one side, and (b) an output image 50 on the other side.

Other embodiments of the invention related to the process of reconstruction model 120 are described with reference to FIGS. 2-7 and are applicable herein. For example, according to some embodiments, during a training stage, ML-based reconstruction model 120 of FIG. 8 may be trained so as to produce, calculate or implement a transformation function, based on a first 3D identity-invariant feature of a first (e.g., puppet) object depicted in image data object 20 and at least one second 3D identity-invariant feature of a second (e.g., driver) object depicted in sampled image data objects 30'. During an inference stage, ML-based reconstruction model 120 may implement transformation function on at least one input image 20, to obtain one or more output or target images 50, depicting a target object. The target object may include at least one 3D identity-invariant feature of a driver object, depicted in the one or more driving images 30.

Figure 10:
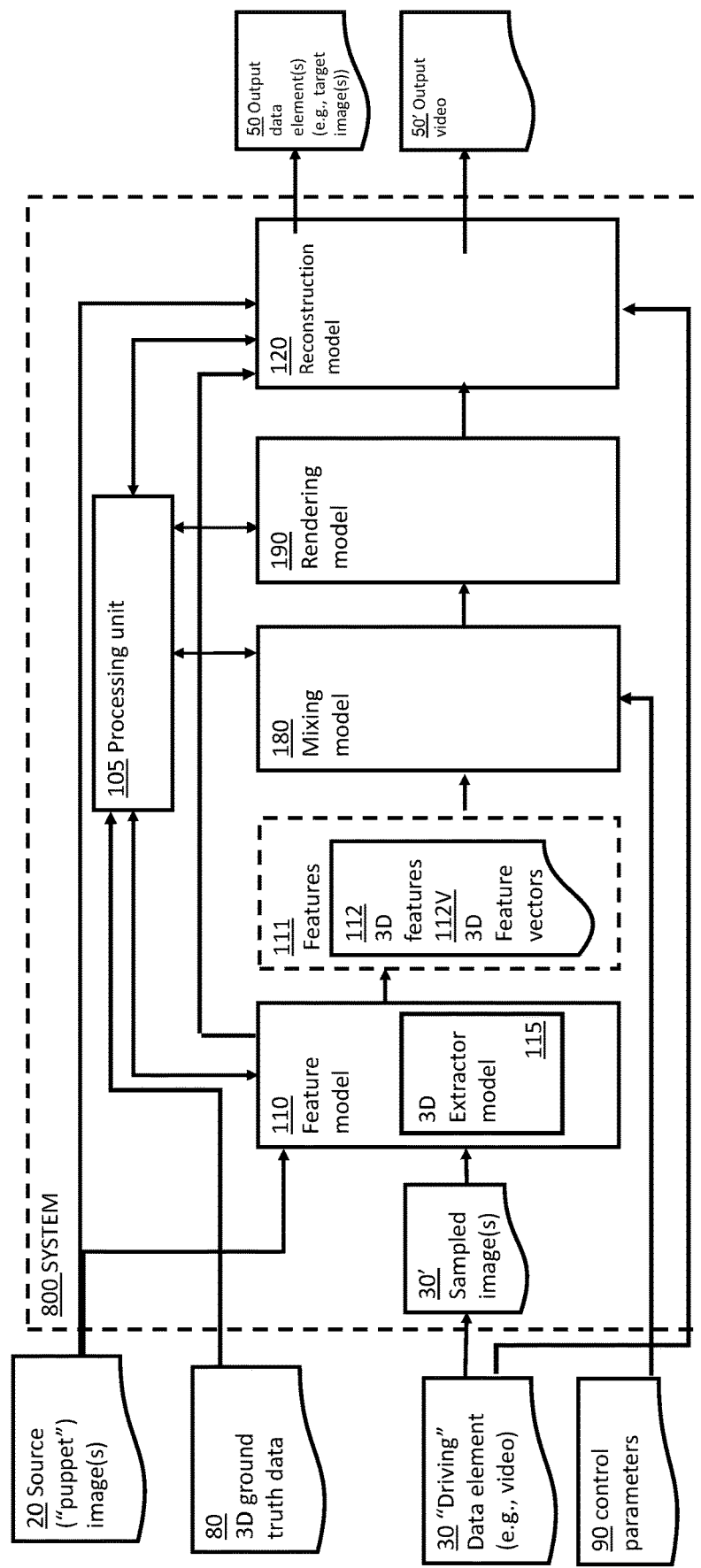
FIG. 10 is a block diagram, depicting another example of a system for ANN based animation including 3D methods, according to some embodiments of the invention.

Reference is now made to FIG. 10, which is a block diagram, depicting another example of a system for ANN based animation including 3D methods, according to some embodiments of the invention. According to embodiments of the invention, components, units, block or elements of system 800 presented in FIG. 10, are carried out similarly as described elsewhere herein, e.g., as described in FIG. 8. Additional elements, e.g., 3D ground truth data 80 and user defined parameters 90 are added to the embodiments of the method and system presented in FIG. 8. It should be understood to a person skilled in the art that the system and methods described with reference to FIG. 10 may be carried out similarly as described elsewhere herein and may further carry out other methods additionally and/or alternatively, e.g., as described in FIG. 8 and in FIGS. 2-7.

According to embodiments of the invention, 3D ground truth data 80 may include information that is known or considered to be real or true information which may be provided by direct observations and measurements. 3D ground truth data 80 may include information related to proper objective data, e.g., may include 3D image data and/or 3D data models related to real features and materials. 3D ground truth data 80 may be used to further calibrate, test, measure, evaluate and adjust the output image 50 by comparing one or more 3D features extracted by model extractor 115 with a related 3D feature from 3D ground truth data 80.

3D ground truth data 80 may be input as an additional information to processing unit 105 and may be used for enhancing the quality of output data element 50 by comparing the output image to data models representing real or true data included in 3D ground truth data 80. Embodiments of the invention may include comparing one or more 3D features from the plurality of 3D features to a related 3D feature from 3D ground truth data 80 and updating the output image based on a calculated gradient between the a 3D features from the plurality of 3D features and the related 3D feature from 3D ground truth data 80.

According to some embodiments of the invention, system 800 may further enhance, augment or improve the performance of rendering model 190 and may input additional controlling parameters, e.g., control parameters 90. Control parameters 90 may include parameters to control, for example, the mixing function applied by mixing model 180. For example, control parameters 90 may define the features taken from each image, and/or may insert additional data to the mixing model, e.g., data which was not included in the original images, e.g., expressions which may not be included in the original images. In some embodiments control parameters 90 may control the mixing function by determining.

Figure 11A:
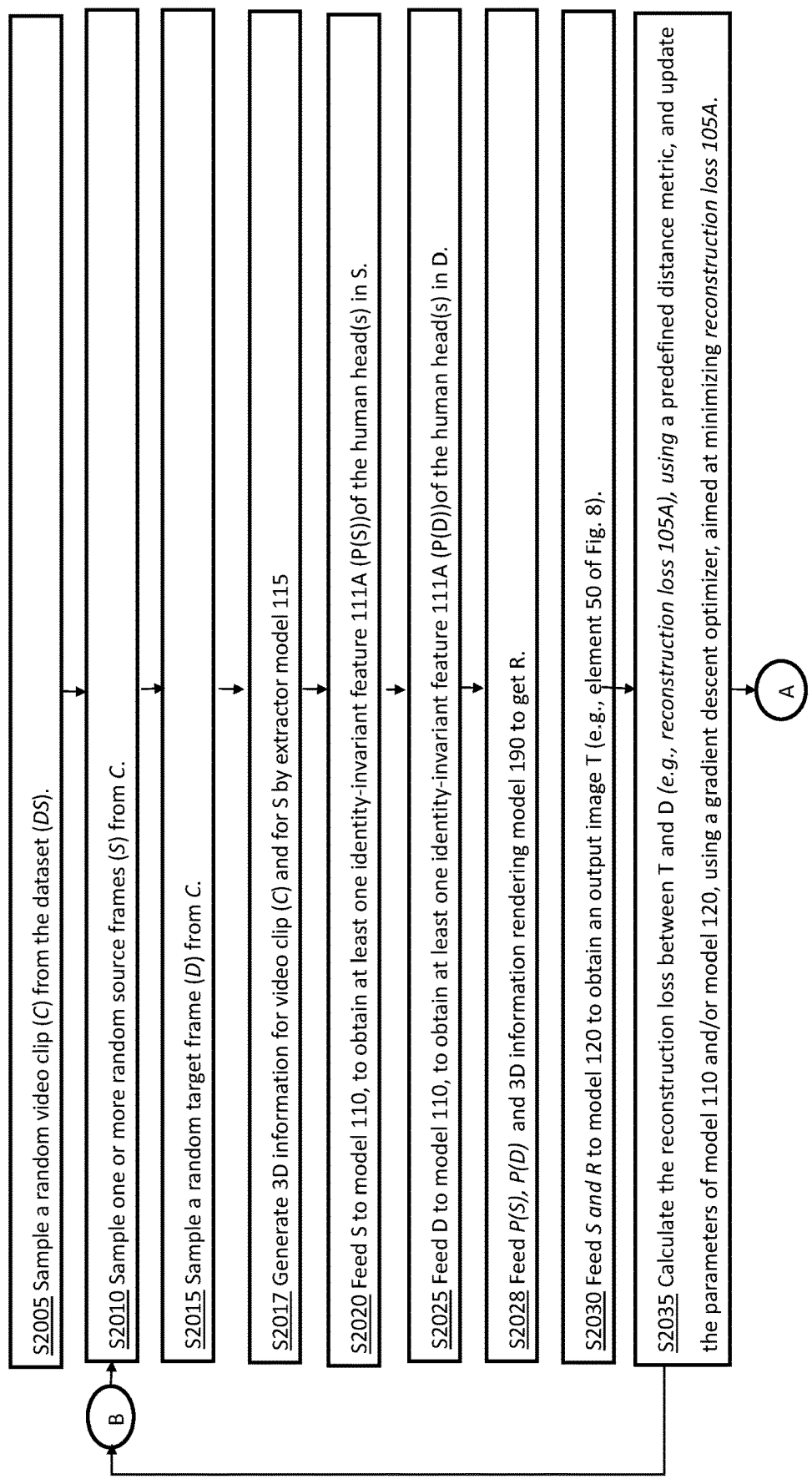
FIGS. 11A and 11B are flow diagrams, jointly depicting an example of a method of training modules of a system for ANN based animation, according to some embodiments of the invention.
Figure 11B:
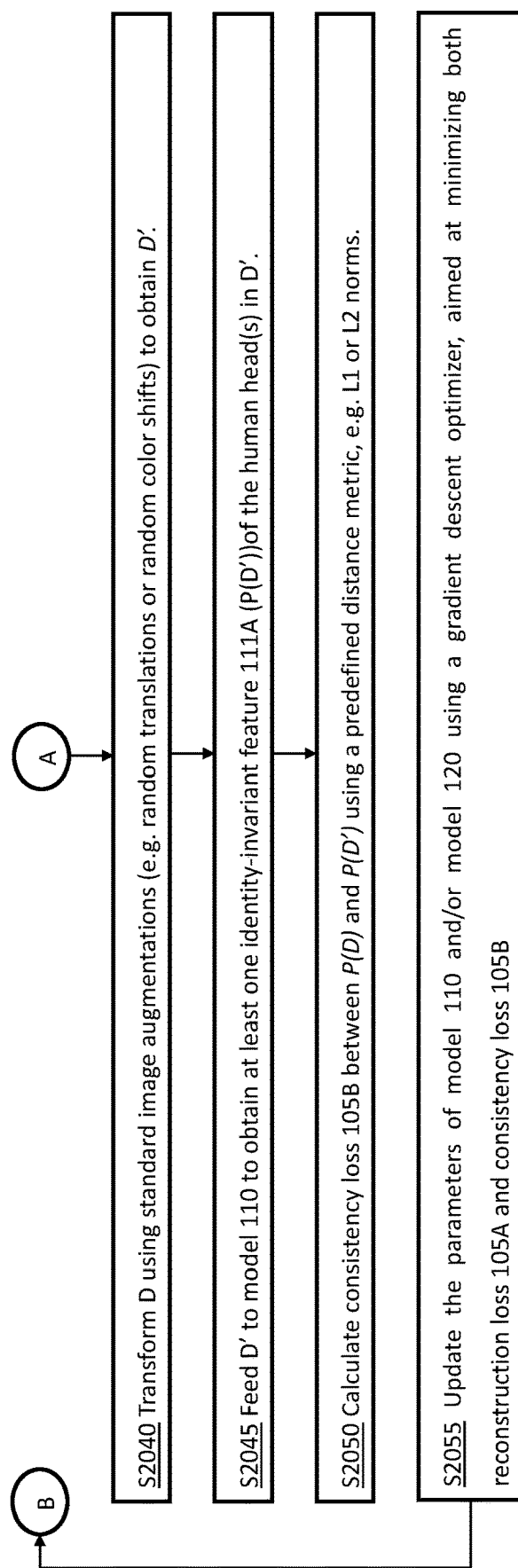

Reference is made to FIGS. 11A and 11B which are flow diagrams, jointly depicting an example of a method of training modules of a system for ANN based animation with rendering, according to some embodiments of the invention. Operations S2005-S2015, S2020-S2025, S2035-S2055 of embodiments of the method of training modules of a system for ANN based animation with rendering are similar to operations with similar reference numerals presented in FIGS. 5A-5B and will not be described again.

As shown in step S2017, extractor model 115 may generate, predict or extract 3D information for video clip (C) and for source image S. The 3D information may include a plurality of 3D features.

As shown in step S2028, processing unit 105 may feed or input the one or more first identity feature vectors P(S), the one or more second identity feature vectors P(D) and the 3D information including the plurality of 3D features extracted in step S2017 as input data to rendering model 190 to get a rendered image (R).

As shown in step S2030 processing unit 105 may feed or input image S, and the rendered image R to model 120 to reconstruction model 120. Reconstruction model 120 may subsequently produce, from this input data, an output image T. Output image T is denoted in FIG. 8 as output image 50.

It may be appreciated by a person skilled in the art that the training of feature model 110, extractor model 115, rendering model and/or reconstruction model 120 may be accomplished by repeated iterations of steps S2005 through S2035 as shown by FIG. 11A, followed by update of parameters or weights of feature model 110 and/or reconstruction model 120, until a stopping condition is met. The stopping condition may, for example, be met when reconstruction loss 105A does not surpass a predefined threshold value.

When the neural networks of feature model 110, extractor model 115, mixing model 180, rendering model 190 and reconstruction model 120 are trained, system 800 may be employed to perform ANN-based animation of an object such as a human face or head, that is depicted in image 20. According to some embodiments, system 800 may receive: one or more static, source head image data elements 20 (S) of an identity I to be animated and a video clip data element 30 (C) of the human head, from which 3D identity-invariant features (e.g., head pose, facial expression features, etc.) may be extracted and transferred to the animated output. The human identities I of source head image data elements 20 (S) and video clip data element 30 (C) may be different (e.g., depicting different people) or identical (e.g., depicting the same person).

Given both input data elements 20 and 30 as described above, processing unit 105 may execute the following procedure in order to create a target human head animation clip (V). This human head animation clip is denoted in FIG. 8 as output video 50'.

Processing unit 105 may feed or input image data elements 20 (S) to feature model 110 to obtain at least one first feature vector that includes one or more identity-invariant features (e.g., pose feature, facial expression feature) of the human head(s) depicted in S. The at least one first feature vector may be denoted herein as P(S). Processing unit 105 may feed or input image data elements 20 (S) and image data elements 30 (D) to and/or extractor model 115 to obtain 3D features.

For one or more (e.g., all) image data elements 30 (D) in video clip C, processing unit 105 may utilize feature model 110 and reconstruction model 120 to generate an output image T (denoted as output data element 40 in FIG. 2). Processing unit 105 may generating output image T by: (a) feeding or inputting image data element 30 (D) to feature model 110 to obtain a feature vector (denoted as P(D)) that includes one or more identity-invariant features of the human head in D; (b) providing P(S) and P(D) and 3D features to rendering model 190 to generate a rendered image R, and (c) providing S and R as input data to reconstruction model 120, to obtain a novel frame or image data element 50 (T).

System 800 may further include an appending module 170, e.g. as described with reference to FIG. 4 adapted to append or assemble a plurality of output images 50 (T), to produce an output video data element 50' (V).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of animating an image of an object, the method comprising:
jointly training a first machine-learning (ML) model, a second ML model, a third ML model and a fourth ML model, wherein the first ML model is trained to extract a plurality of three dimensional (3D) features of an object depicted in an image, the second ML model is trained to calculate a mixing function, the third ML model is trained to generate a rendered image, and the fourth ML model is trained to generate an output image;
receiving a first image, depicting a puppet object;
sampling an input video, depicting a driver object, to obtain a second image;
extracting, by the first ML model, a plurality of three dimensional (3D) features from the first image and from the second image including a value of a first 3D identity-invariant feature of the puppet object, and a value of a second 3D identity-invariant feature, from the second image;
calculating, by the second ML model, a mixing function, based on the first 3D identity-invariant feature and the second 3D identity-invariant feature;
applying the mixing function on the plurality of 3D features;
generating, by the third ML model, a rendered image, based on the plurality of 3D features, the first 3D identity-invariant feature and the second 3D identity-invariant feature; and
generating, by the fourth ML model, an output image based on the rendered image, the plurality of 3D features, the first image and the second image, wherein the output image depicts a target object comprising at least one 3D identity-invariant feature of the driver object.

2. The method of claim 1, further comprising repeating the steps of extracting, calculating, applying, generating the rendered image and generating the output image to obtain a next output image.

3. The method of claim 2, further comprising appending the next output image to the output image to produce an output video depicting animation of the puppet object.

4. The method of claim 1, wherein calculating the mixing function comprises assigning a first weight value to the first 3D identity-invariant feature and assigning a second weight value to the second 3D identity-invariant feature.

5. The method of claim 1, wherein the mixing function comprises a combination between first 3D identity-invariant feature and the second 3D identity-invariant feature.

6. The method of claim 1, wherein the second 3D identity-invariant feature is related to a scene depicted in the second image.

7. The method of claim 1, wherein the output image has higher quality than the quality of the rendered image.

8. The method of claim 1, further comprising comparing one or more 3D features from the plurality of 3D features to a related 3D feature from 3D ground truth data and updating the output image based on a calculated gradient.

9. The method of claim 1, wherein applying the mixing function on the plurality of 3D features comprises applying the mixing function on a first set of 3D features from the first image and on a second set of 3D features from the second image.

10. A system for animating an image of an object, the system comprising:
a memory; and
a processor configured to:
jointly train a first machine-learning (ML) model, a second ML model, a third ML model and a fourth ML model, wherein the first ML model is trained to extract a plurality of three dimensional (3D) features of an object depicted in an image, the second ML model is trained to calculate a mixing function, the third ML model is trained to generate a rendered image, and the fourth ML model is trained to generate an output image;

receive a first image, depicting a puppet object;

sample an input video, depicting a driver object, to obtain a second image;

extract, by the first ML model, a plurality of three dimensional (3D) features from the first image and from the second image including a value of a first 3D identity-invariant feature of the puppet object, and a value of a second 3D identity-invariant feature, from the second image;

calculate, by the second ML model, a mixing function, based on the first 3D identity-invariant feature and the second 3D identity-invariant feature;

apply the mixing function on the plurality of 3D features;

generate by the third ML model, a rendered image, based on the plurality of 3D features, the first 3D identity-invariant feature and the second 3D identity-invariant feature; and generate by the fourth ML model an output image based on the rendered image, the plurality of 3D features, the first image and the second image, wherein the output image depicts a target object comprising at least one 3D identity-invariant feature of the driver object.

11. The system of claim 10, wherein the processor is further configured to repeat the steps of extract, calculate, apply, generate the rendered image and generate the output image to obtain a next output image.

12. The system of claim 11, wherein the processor is further configured to append the output image to the output image produce an output video depicting animation of the puppet object.

13. The system of claim 10, wherein the processor is further configured to calculate the mixing function by assigning a first weight value to the first 3D identity-invariant feature and assigning a second weight value to the second 3D identity-invariant feature.

14. The system of claim 10, wherein the mixing function comprises a combination between first 3D identity-invariant feature and the second 3D identity-invariant feature.

15. The system of claim 10, wherein the second 3D identity-invariant feature is related to a scene depicted in the second image.

16. The system of claim 10, wherein the output image has higher quality than the quality of the rendered image.

17. The system of claim 10, wherein the processor is further configured to compare one or more 3D features from the plurality of 3D features to a related 3D feature from 3D ground truth data and updating the output image based on a calculated gradient.

18. The system of claim 10, wherein the processor is further configured to apply the mixing function on the plurality of 3D features comprises applying the mixing function on a first set of 3D features from the first image and on a second set of 3D features from the second image.

19. A method of animating an image of an object, the method comprising:

jointly training a first machine-learning (ML) model, a second ML model, a third ML model and a fourth ML model, wherein the first ML model is trained to extract a plurality of three dimensional (3D) features of an object depicted in an image, the second ML model is trained to calculate a mixing function, the third ML model is trained to generate a rendered image, and the fourth ML model is trained to generate an output image;

determining, by the first ML model, a plurality of three dimensional (3D) features from a first image, depicting a first object and from a second image, wherein the second image is sampled from an input video depicting a second object;

applying a mixing function on the plurality of 3D features, wherein the mixing function is calculated by the second ML model, based on a first 3D identity-invariant feature of the first object and a second 3D identity-invariant feature from the second image;

generating, by the third ML model, a created image, based on the plurality of 3D features, the first 3D identity-invariant feature and the second 3D identity-invariant feature; and generating, by the fourth ML model, an output image depicting a target object comprising at least one 3D identity-invariant feature of the second object, wherein the output image is generated based on the plurality of 3D features, the created image, the first image and the second image.

20. The method of claim 19, further comprising repeating the steps of determining, applying, and generating the created image and generating the output image to obtain a plurality of output images; and generating a video depicting animation of the first object from the plurality of output images.

* * * * *